United States Patent [19]

Hodgson et al.

[11] Patent Number: 4,595,265
[45] Date of Patent: Jun. 17, 1986

[54] PORTABLE FIELD INSPECTION MICROSCOPE FOR INSPECTING A BUTT END OF A CYLINDRICAL OBJECT, SUCH AS A FIBER OPTICS CABLE

[76] Inventors: R. W. Hodgson, 1680 N. Vine St., #204, Hollywood, Calif. 90028; Herbert D. Barham, 3330 N. 18th St., Phoenix, Ariz. 85916

[21] Appl. No.: 481,854

[22] Filed: Apr. 4, 1983

[51] Int. Cl.[4] .................. G02B 21/06; G02B 21/10; G02B 21/14
[52] U.S. Cl. .................................... 350/523; 350/525
[58] Field of Search .............. 350/523, 525, 529, 507, 350/410, 521, 518, 530, 527; 356/237

[56] References Cited

U.S. PATENT DOCUMENTS

| | | | |
|---|---|---|---|
| 1,444,400 | 2/1923 | Silverman | 350/525 X |
| 1,873,149 | 8/1932 | Perez | 350/523 |
| 2,103,230 | 12/1937 | Benford et al. | 350/525 X |
| 3,202,050 | 8/1965 | Seidenberg | 350/410 |
| 3,352,026 | 11/1967 | Elwell | 350/521 X |
| 4,072,395 | 2/1978 | Mohon | 350/519 |
| 4,251,127 | 2/1981 | Yamaguchi | 350/410 X |
| 4,303,299 | 12/1981 | Clark | 350/529 |

Primary Examiner—John K. Corbin
Assistant Examiner—David Lewis

[57] ABSTRACT

An improved portable field inspection microscope intended primarily for, but not in all cases limited to, use in inspecting butt ends of fiber optics cables, or other similar cylindrical objects, and including a receiver, holder and positioner adapted to receive such a butt end of a fiber optics cable, or the like, and to position same coincident with a selected butt-end-surface-viewing plane, which may also be considered as a microscope focusing plane, which lies appropriately forwardly of a microscope optical-path-defining longitudinal cylindrical inner chamber in a small portable housing and which not only carries said receiver, holder and positioner at a forward location, but intermediately carries microscope objective lens mounting apparatus and a microscope objective lens assembly for focusing on said focusing plane, and with the housing also being further rearwardly provided with microscope eyepiece lens mounting apparatus and an eyepiece lens assembly longitudinally adjustably carried for focusing on, and providing a desired degree of apparent visual image magnification of, a butt end surface of a fiber optics cable, or the like, which is being viewed and inspected while received, held, and positioned in the focusing plane. The housing is also provided with bright field illuminator apparatus and dark field illuminator apparatus and controllably operable switch and battery assembly structures for providing either bright field illumination of directly forwardly incident light and directly rearwardly reflected reverse light, or dark field illumination of annularly arranged sharply angularly directed incident light and consequent sharply angularly reflected and effectively "lost" reverse light for dark field illumination of a butt end surface positioned in the focusing plane for viewing and inspection.

4 Claims, 29 Drawing Figures

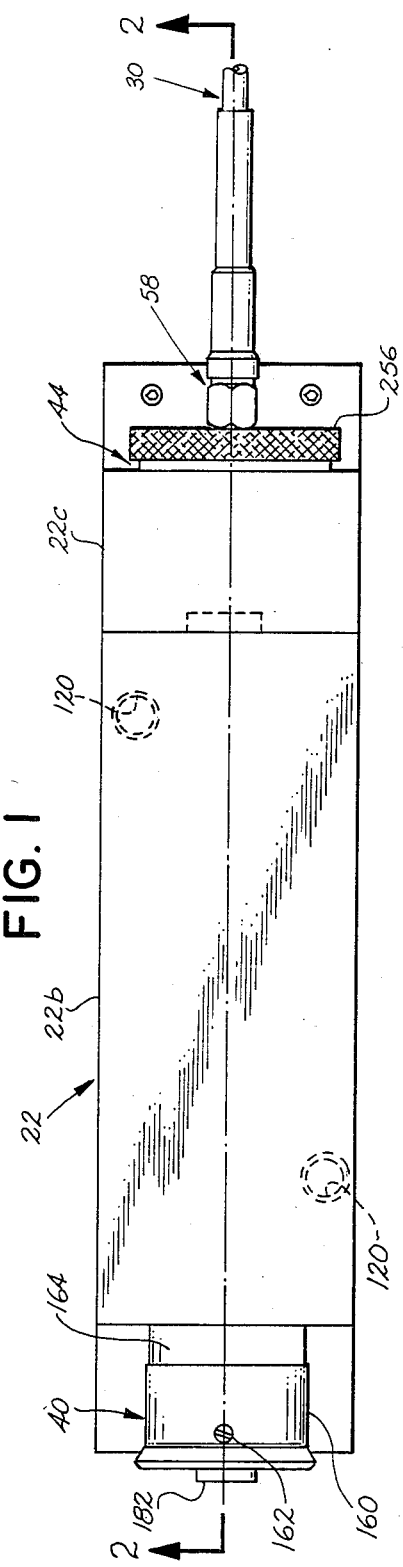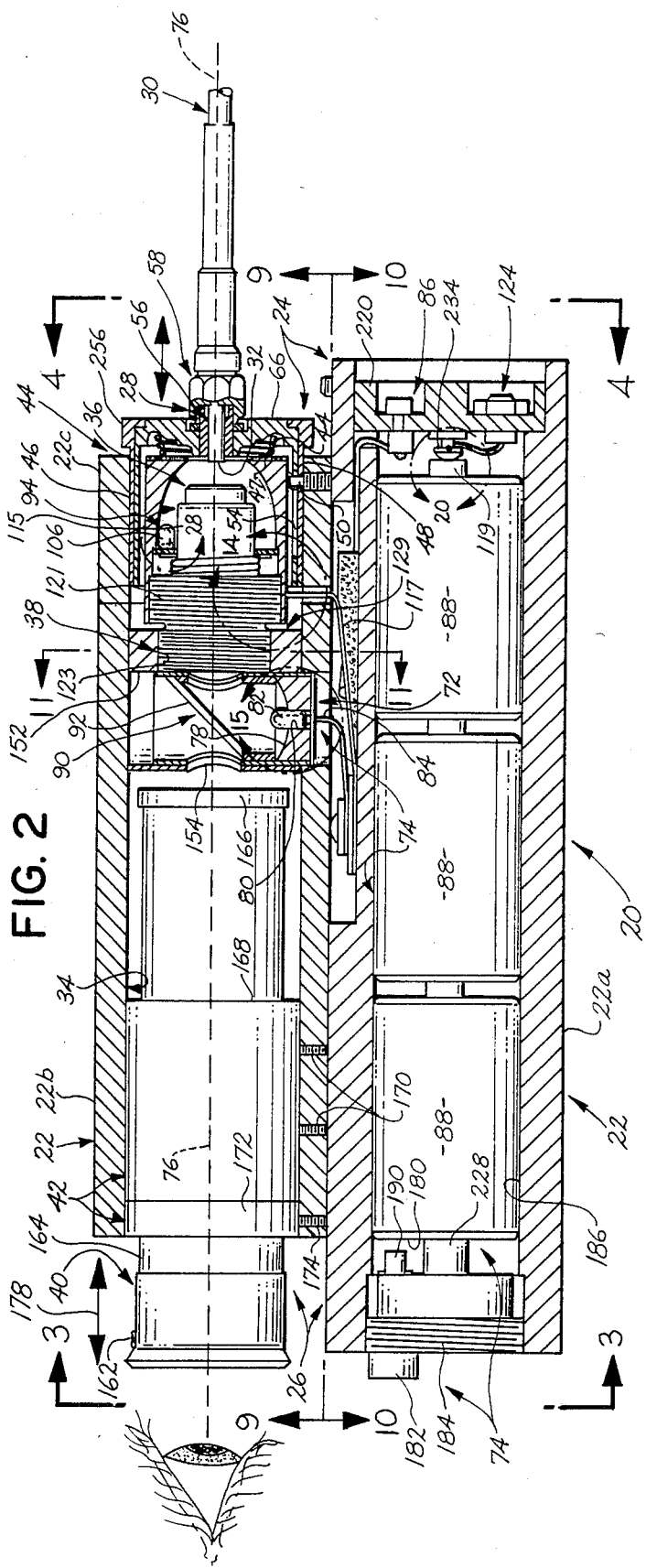

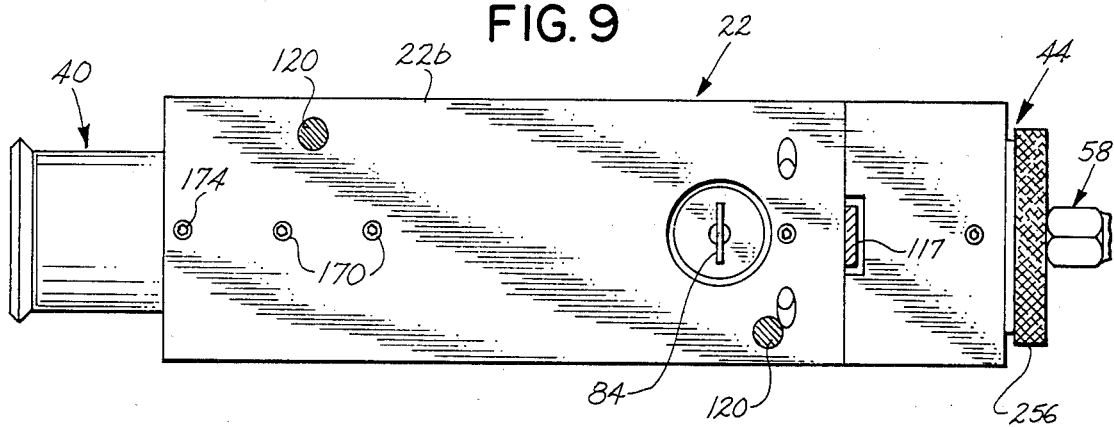
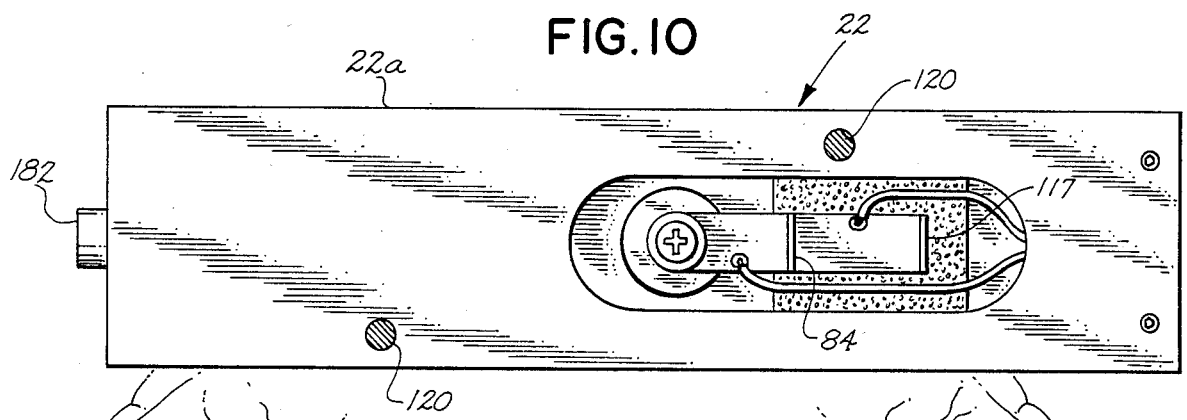
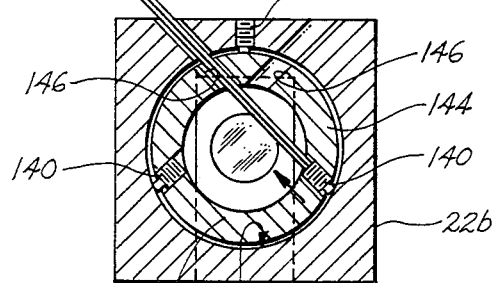
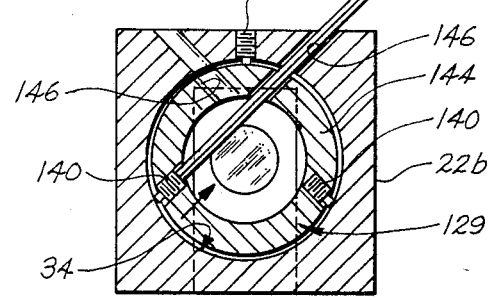
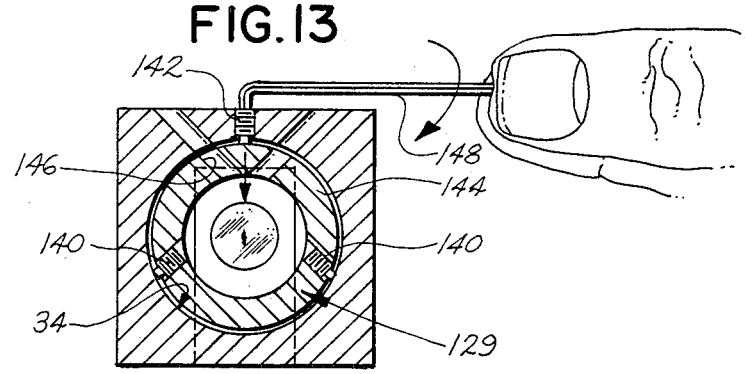

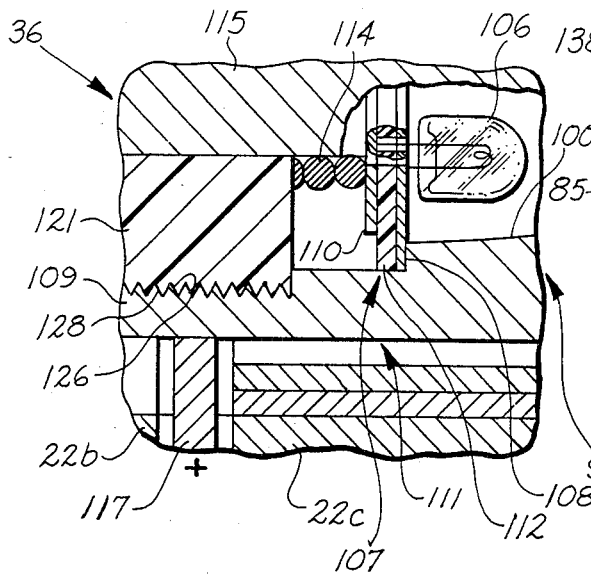
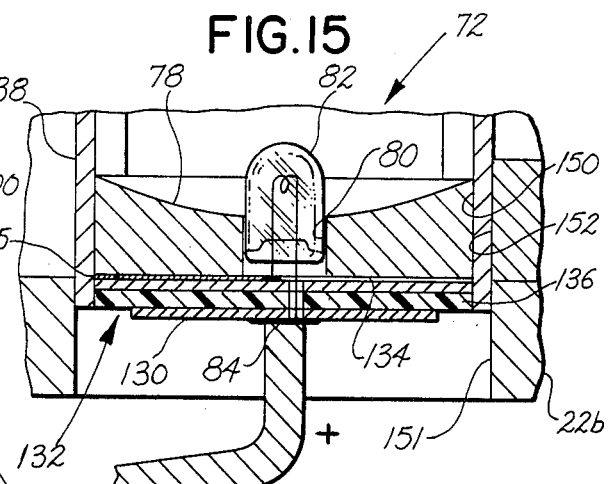
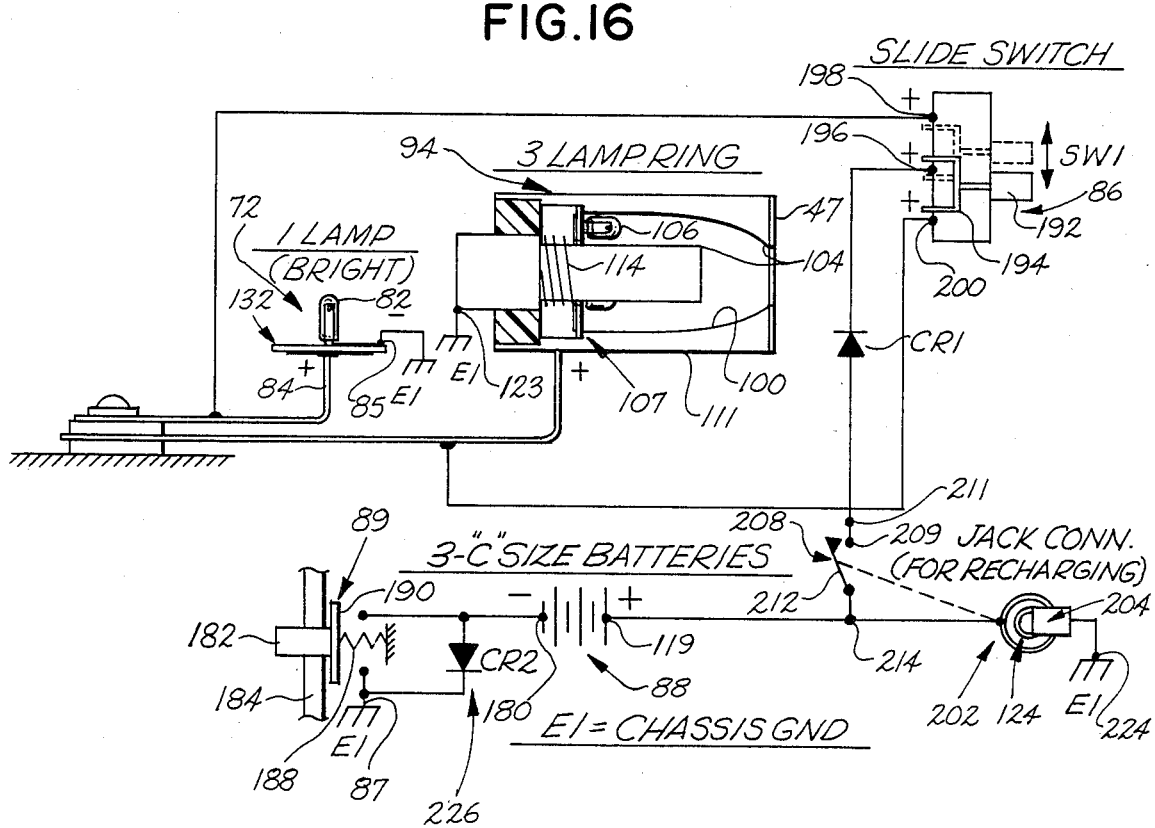

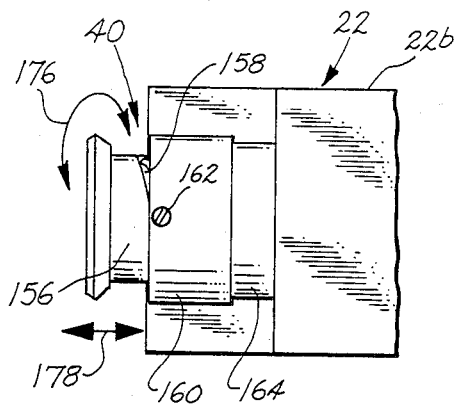
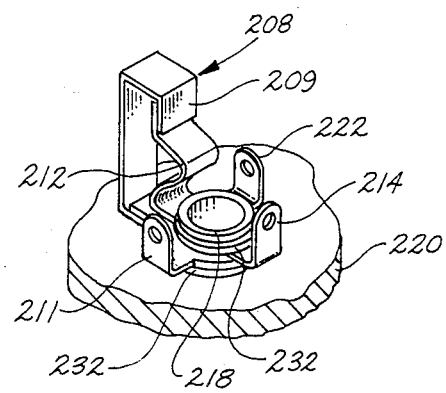
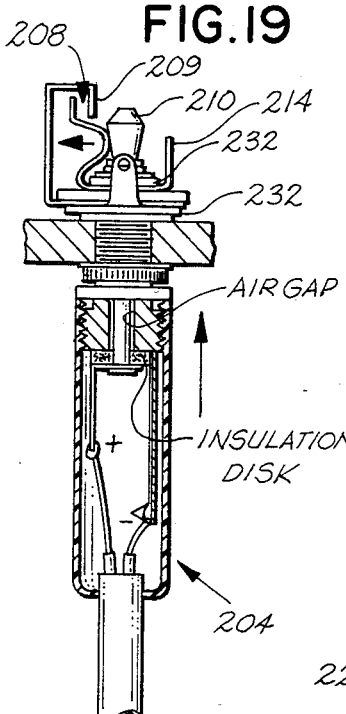
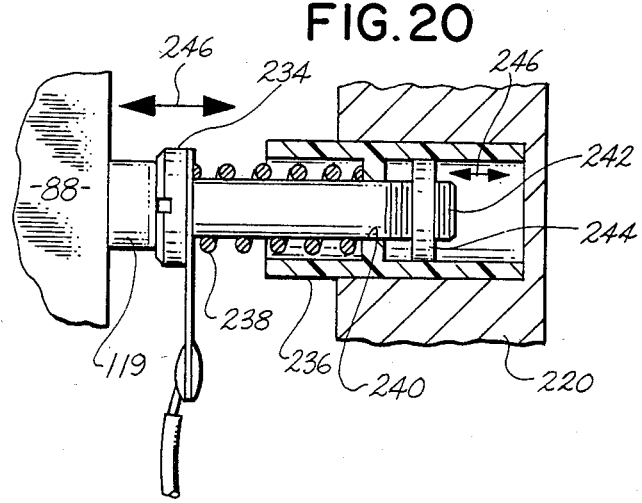
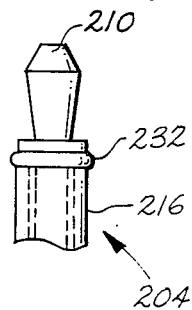
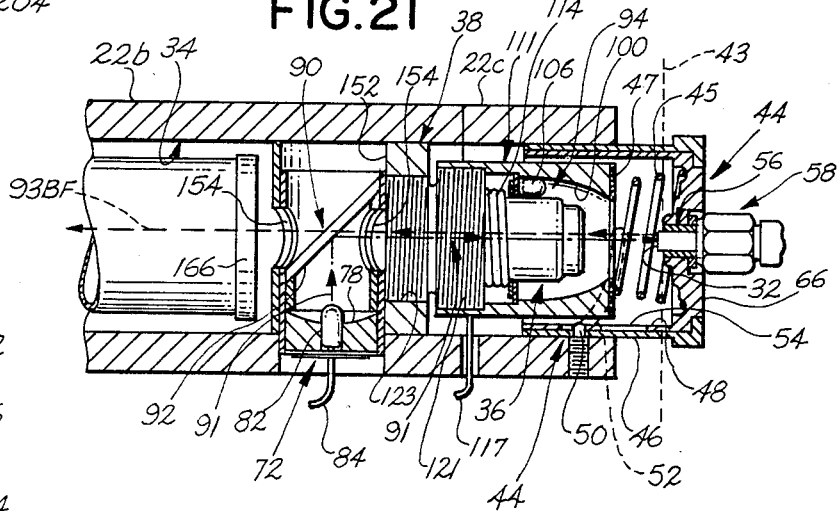

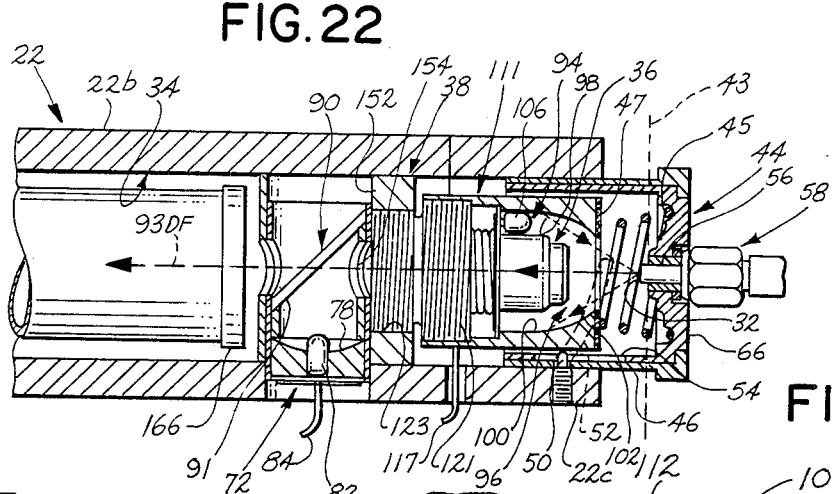
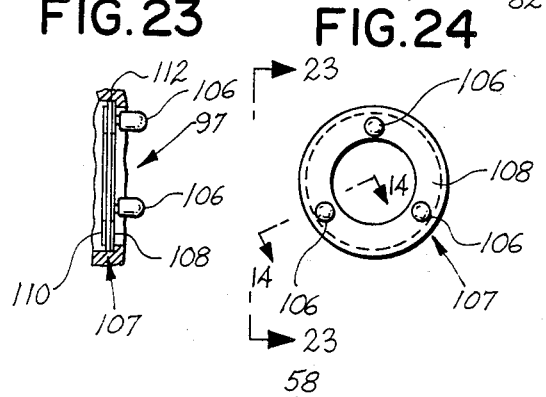
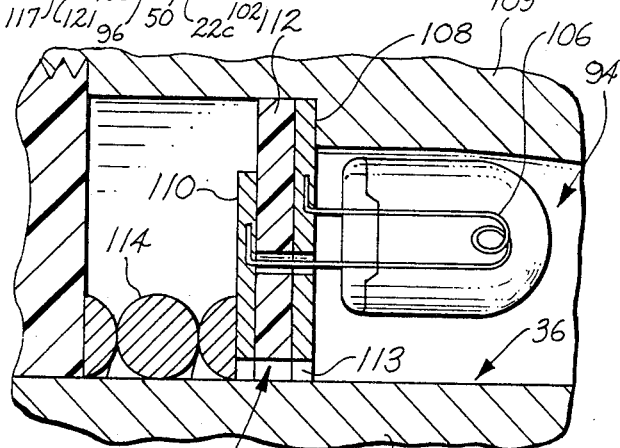
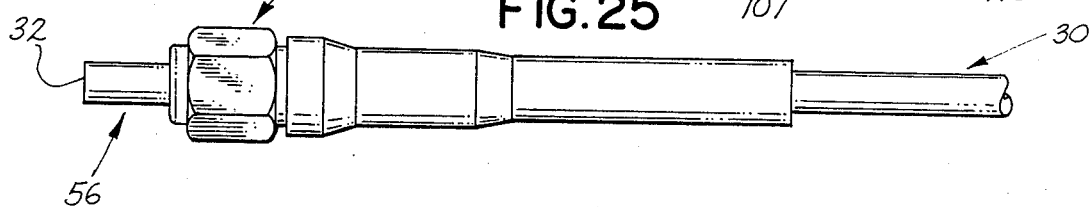
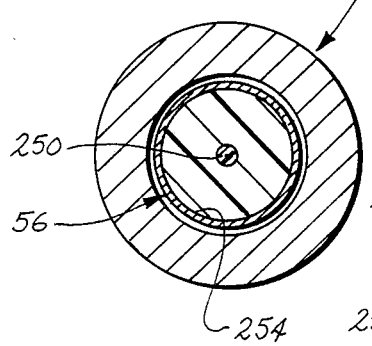
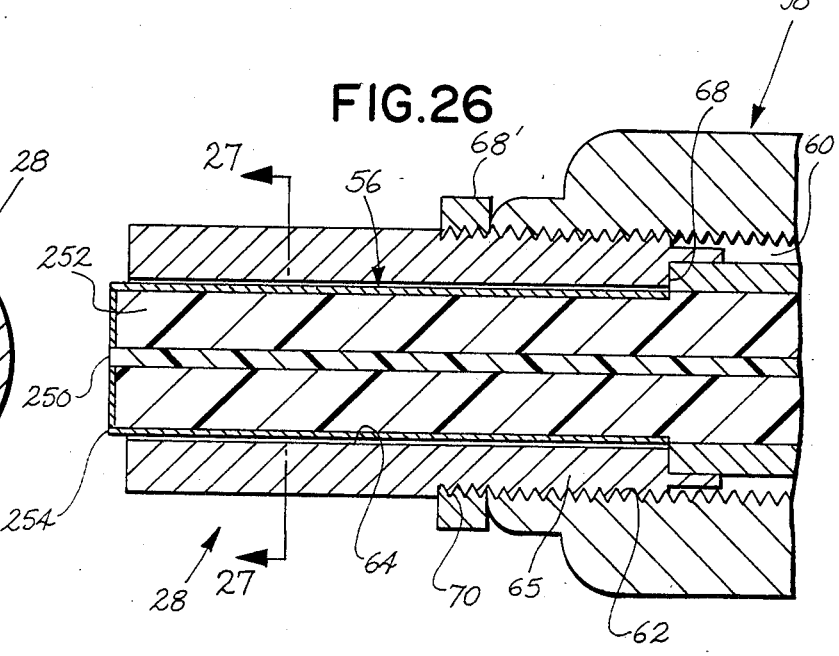

PORTABLE FIELD INSPECTION MICROSCOPE FOR INSPECTING A BUTT END OF A CYLINDRICAL OBJECT, SUCH AS A FIBER OPTICS CABLE

BACKGROUND OF THE INVENTION

The field of the invention is generally that of microscopes and, more particularly, of portable field inspection microscopes intended primarily for relatively low power inspection of flat butt end surfaces of small cylindrical objects, such as the flat butt end surface of a fiber optics cable, or the like. The need for this type of relatively small, relatively lightweight and, therefore, readily portable field inspection microscope has arisen from the quite recent relatively extensive development of the use of fiber optics cables for communication purposes. This has only recently assumed any substantial measure of significance because until very recently, most long distance intelligence transmission lines, such as used by the telephone company, the government or others active in that field have usually been of the so-called "coaxial cable" type, the wave guide type, or have been of a high frequency broadcast transmission type involving spaced transmitters and receivers and a number of intermittently and interveningly located repeater stations, or the like. The prior art use of such systems has generally involved the providing of a relatively small bandwidth for each transmission channel in the case of a voice transmission and substantially wider bandwidths for each video signal transmission channel, with each transmission channel being appropriately coded at the originating end and being correspondingly decoded and consequently segregated from the signals of all other transmission channels carried by the same transmission line at the destination end. Thus, the number of transmission channels which could be handled by any particular such prior art transmission line was limited by its total frequency transmission bandwidth capability and the bandwidth requirement for each individual signal channel unless multiplexing or time-sharing, or functional equivalent was employed. There was also the problem of the signal of one channel sometimes interferring with the signal of another physically adjacent channel by what is known as "cross talk" or the like. Thus, it can be seen that once all of the available total bandwidth handling capability of a particular transmission line had been used, there was or has been no possibility of adding to its signal channel handling maximum capabilities and the only way to provide for such has been to build additional transmission lines (which, for the purposes of this discussion, are also intended to mean the hereinbefore-mentioned type of system involving prior art ultra high-frequency broadcast transmission of signals on individual effectively adjacent channels.) Such physical expansion of transmission line facilities has been, and is, extremely costly and is further complicated by physical space availability problems in many cases, particularly where they pass through portions of large cities and where they must compete for space with other underground utility and communication installations. In recent years, it has been found that fiber optics cables require a much smaller physical space for the transmission or any total frequency bandwidth than do any of the above-mentioned prior art types of transmission lines and this means that many more channels of audio signals, video signals, computer data signals or any other type (or types) of signals which are desired to be transmitted can be handled in the space formerly occupied by one of the above-mentioned prior art types of transmission lines, thus, not requiring the building of new transmission lines or a greater space availability for multiple such prior art types of transmission lines, but merely requiring replacement of such a prior art transmission line with a new much more effective fiber optics cable.

Such a fiber optics cable can be of a single fiber type or of a multiple fiber type and, in the latter case, the multiple fibers may be encased in a single cladding carrier matrix or, in certain instances, in individual carrier matrices. Also, with respect to each individual light-transmissive fiber, it may be of the monomode (single-mode) or multimode (plural-mode) type.

In a monomode (single-mode) arrangement of a typical representative, but non-specifically limiting form, the light-transmissive fiber (exclusive of cladding) may be extremely narrow or thin in a transverse direction, often being approximately five microns in diameter although this dimension may vary somewhat. The exterior cladding may be of any diameter which is thought to be suitable for cable construction and/or mechanical handling purposes, etc. In this type of monomode fiber, the reason for the extreme narrowness of the light-transmissive central fiber is because the narrowness thereof virtually guarantees that a single ray of light can pass from the beginning of such a narrow fiber to the opposite end thereof substantially without major oblique angular dispersion of multiple light rays and subsequent oblique angular interior reflection along the length of a light-transmissive fiber in the manner of a light-transmissive fiber of greater diameter, such as is the case with what is known as a multimode fiber. Thus, minimal light-losses occur, and no fuzzy or dispersed effect occurs relative to transmitted light pulses traveling from the beginning or input end to the output end of such an extremely narrow monomode light-transmissive fiber. Because of this feature, very high frequencies of light pulses can be transmitted along such a monomode light-transmissive fiber with minimal losses and with the need for any possible optical repeater stations along a very long line being virtually eliminated or greatly reduced.

In the case of multimode light-transmissive fibers, each such fiber is typically of about ten times the diameter of the previously-referred to monomode type of light transmissive fiber—say, approximately of a 50 micron diameter, although not specifically so limited to precisely that diameter, which is to be construed as representative only. Each such multimode light-transmissive fiber transmits multiple rays of light there-along between an input end and an output end thereof in a very efficient manner involving small light losses along the length thereof and some fuzziness or dispersion of light pulses transmitted therealong between an input end and an output end of such a multimode light-transmissive fiber. However, the transmission efficiency of such a multimode light-transmissive fiber is substantially less than that previously mentioned hereinbefore in connection with monomode light-transmissive fibers. Also, limitations with respect to the frequencies of light pulse transmission exist in connection with such multimode light-transmissive fibers to a greater extent than is true of such monomode light-transmissive fibers. This is so because in a multimode fiber, parts of each light pulse are reflected from inside surfaces of the fiber as it travels therealong and thus, such reflected light rays travel a longer distance than other parts of the light pulse moving straight along the light-transmissive fiber. This causes the reflected modes to arrive at the output end of the multimode fiber somewhat later than the unreflected ones, producing in varying degrees a somewhat fuzzy or dispersed pulse at the output end. This may limit the effective distance of multimode fiber pulse transmission, or require effective optical repeater stations dispersed along the length thereof.

In any case, both of the hereinbefore-described types of light-transmissive fibers are much more efficient than other non-optical forms of signal transmission and both types are intended to have splicing operations along the lengths thereof greatly facilitated through the use of the novel inspection microscope of the present invention.

In addition to the hereinbefore-referred to monomode fibers and multimode fibers, the inspection microscope of the present invention can be used for greatly facilitating the splicing of single fiber types of fiber optics cables (whether the single fiber is monomode or multimode) or splicing multiple fiber cables (whether each of the fibers is monomode or multimode, or any combination thereof.)

Incidentally, it should be noted that the light-transmissive fiber may be glass, plastic or any suitable material having a higher index of refraction than the exterior cladding material surrounding same and giving physical "body" to the composite fiber optics cable. This will result in the interior reflection of all interior angularly directed light rays which strike the interface between the fiber and the exterior cladding material at less than an angle which is a function of the difference in the indices of refraction of the fiber and its cladding. This refraction index difference causes the inner light-transmissive to function as a so-called "light pipe", which term will be referred to hereinafter in connection with both the multiple fiber type of fiber optics cable and the single fiber type of fiber optics cable. The multiple fiber type of fiber optics cable will be described first, followed later by the single fiber type of fiber optics cable.

Such a multiple-fiber type of fiber optics cable usually consists of a considerable number of individually separate effectively longitudinally directed and closely laterally adjacent so-called "light pipes" often physically held in position in an appropriate mounting matrix such as a plastic resin for example—often of a transparent or translucent type. Each so-called "light pipe" has an extremely small thickness—much less than any of the signal transmissive portions of a prior art transmission line of any of the types previously mentioned, and each so-called "light pipe" is made of a light-transmissive material, such as glass and/or plastic and usually material, or equivalent, having optical characteristics with respect to refraction and reflection characteristics such that substantially longitudinally directed light rays making up a longitudinal beam of light entering an input end of such a "light pipe" are effectively, largely incapable of passing obliquely through the outer wall of the "light pipe" and thus escaping the "light pipe", but, instead, are substantially reflected back into and/or are effectively retained within the interior of the "light pipe" for transmission forwardly and longitudinally along the length thereof from one end to the other.

The hereinbefore-mentioned interior self-reflection feature of such a "light pipe" prevents loss of interior light so that a modulated light signal can be transmitted over very long distances with minimal losses by such a light pipe which, incidentally, can be of very small cross-sectional area. This is the essential characteristic upon which a fiber optics cable relies because, in the multi-fiber form thereof, many such "light pipes" can be positioned adjacent to one another in a mounting matrix with the entire cable being of much smaller cross-sectional area than has been necessary in the past for any of the hereinbefore-mentioned types of transmission lines which would even being to approach the total message-handling capability (or total frequency bandwidth-handling capability) of such a fiber optics cable, which incidentally, may be of flexible substantially unbreakable construction relatively impervious to corrosion and damage from external weathering, water, chemicals, or the like.

However, in any transmission line, it is necessary to be able to cut into the line at any desired location along its length for adding or removing other lines or various forms of output or input equipment or even for repairing any damaged portion of such a line, and this requires that there be some convenient mode of effectively splicing cut transmission lines to each other in the field and with relatively portable and inexpensive equipment. In the case of a fiber optics cable, this normally requires that a cut end of such a fiber optics cable be perpendicular to the longitudinal direction and have a substantially flat cut butt end so that a similar perpendicular substantially flat butt end of another fiber optics cable portion can be effectively joined or spliced to the first-mentioned fiber optics cable butt end by placing them in virtually complete-area-contact relationship to each other, butt end to butt end. If this is done, there will be no small open spaces between cut ends of individual fiber optics so-called "light pipes" in the two different portions of the fiber optics cable, which would cause severe attenuation or loss of transmitted light and would seriously interfere with the long distance transmission of modulated light carrying signals along such a fiber optics cable.

In such a fiber optics cable, where it is of a type including a number of very closely laterally adjacent longitudinally directed, small cross-sectional area "light pipes", the connection or reconnection of flat butt end surfaces thereof might initially appear to present a small problem with respect to correctly aligning individual light pipes of individual separate channels with each other. This apparent problem can be met and overcome by having the light pipes so closely laterally adjacent that any abutment of the cable ends will align substantially all or most of the "light pipe" ends with other "light pipe" ends and without considering relative rotative positioning of each cable butt end with respect to the other one. Where such a junction is effected and multichannel transmission is accomplished along multiple so-called "light pipes" and the effective separation between different channels is accomplished by time sharing, time division, electronic switching and/or effective commutation arrangements, it will make no difference whether the relative rotative position of one cable butt end is moved relative to another end adjacent cable butt end and all that is necessary is to provide the effective encoding or multiplexing means at the input end and corresponding decoding and demultiplexing means at the output end thereof. Of course, it is also possible to provide fewer or only one effective "light pipe" in a cable with visual inspection means to provide for visual rotative adjustment and alignment of a relatively few such cut "light pipes", or to provide for no such rotative adjustment in the case of a single "light pipe". Any or all of these arrangements or other functional equivalents can be used in such a fiber optics cable where the novel inspection microscope of the present invention is intended for use to inspect for the requisite cable butt end flatness needed for effective splicing or welding of such cable butt ends together.

In the case of a single-fiber type of fiber optics cable, wherein the single fiber is usually centrally-positioned right along the axis of the exterior cladding material, the type of butt end flatness needed for effective splicing of two opposed butt ends, again requires perfect flatness of the two fiber optics cable butt ends to be joined and thus, the novel inspection microscope of the present invention will provide very effective means for checking such cable butt end flatness.

Thus, it is clear that the provision of a small relatively lightweight portable field inspection microscope for inspecting fiber optics cable butt ends for substantially perfect flatness thereof to facilitate the joining of same in the manner mentioned above in a light-loss-minimizing fashion would be extremely desirable, and it is precisely such an easily operated fiber optics cable butt end flatness inspection microscope which is provided by and in the present invention, and which has advantages completely overcoming various prior art disadvantages and limitations and thus making possible the widespread use of fiber optics cables for multiple channel signal transmission having advantages which have been previously referred to and which flow from, and occur by reason of, the specific features of the invention pointed out hereinafter.

SUMMARY OF THE INVENTION

Generally speaking, the portable field inspection microscope of the present invention comprises a housing provided (usually at or adjacent to one end) with a butt end receiver, holder, and positioner adapted to receive a butt end of a cylindrical object (usually comprising a fiber optics cable) and to position the same at or coincident with a selected butt-end-surface-viewing plane (which shall also be referred to as the focusing plane) and with the housing also being provided with an optical-path-defining longitudinal inner chamber optically communicating at a forward end with said butt end receiver, holder, and positioner and being intermediately provided with microscope objective lens mounting means and microscope objective lens means optically aligned with said receiver, holder and positioner and being controllably focusable on the previously-mentioned focusing plane. The housing is also provided (usually at or adjacent to) an opposite end of the optical-path-defining chamber with microscope eyepiece lens mounting means and microscope eyepiece lens means, usually longitudinally adjustable carried thereby, for focusing and providing a desired degree of apparent visual image magnification of the butt end of a fiber optics cable (or other cylindrical object) while received, held and positioned with said butt end lying in the focusing plane. The housing is also provided with controllably and selectively energizable bright field illuminator means and dark field illuminator means each arranged for injection of the corresponding illumination provided thereby into the interior of the optical-path-defining chamber in a manner providing direct forward bright field incident illumination on a fiber optics cable butt end being viewed in the focusing plane or sharply angularly oblique (annular) dark field illumination on such a butt end surface being viewed in the focusing plane.

In one preferred form, focusing is brought about by the inclusion of focusing means comprising means for manually adjusting the relatively longitudinal spacings between the lens means and/or the focusing plane and, in one specific preferred form, this comprises means at the front end of the optical-path-defining chamber comprising an outer spirally grooved sleeve, an inner longitudinally grooved sleeve and a short inwardly directed transverse pin fixedly carried by the housing and projecting into the groove in each of said two sleeves whereby relative rotation of the outer spirally grooved sleeve relative to the fixed pin end will effectively produce longitudinal focusing movement of the pair of sleeves and a butt end of a cylindrical object (such as a butt end of a fiber optics cable) carried by the previously-mentioned butt end receiver, holder and positioner which is substantially centrally carried by said inner sleeve.

In one preferred form, the bright field illuminator means is so positioned in the housing as to be arranged to laterally inject bright field illuminating light into the optical-path-defining chamber where redirecting means is positioned for redirecting said bright field illuminating light forwardly and longitudinally along the optical axis of the optical-path-defining chamber. In this version, the redirecting means is also capable of allowing directly reflected bright field light returning from a flat fiber optics cable butt end to pass rearwardly through the redirecting means to the eyepiece lens means. In one form, it may comprise a partially reflective and partially transmissive angularly positioned mirror, or any other functional equivalent. The dark field illuminating means may comprise a source of light, preferably annularly or circularly arranged with respect to the interior of the optical-path-defining inner chamber, preferably providing a substantially annular ring of light forwardly directed toward a forwardly converging effective mirror or reflector means terminating in a frontally-positioned circular aperture and annular-slot-defining means for inwardly angularly obliquely reflecting an annular ring of light forwardly into what might be termed a plane of maximum concentration of said obliquely directed incident dark field illumination rays of light so as to be coincident with the previously-mentioned focusing plane and so as to be of such angular orientation that light reflected from a butt end being viewed will also be angular to such an extent as to be effectively trapped and to be incapable of being returned to the eyepiece lens means except from regions of surface irregularities or discontinuities on the butt end being viewed.

OBJECTS OF THE INVENTION

With the above points in mind, it is an object of the present invention to provide a portable field inspection microscope for inspecting butt ends of a cylindrical object, such as a fiber optics cable or the like, and having any or all of the features referred to herein, generically and/or specifically, and which is of relatively low cost construction, (insofar as microscopes and related optical equipment are concerned) both as to the initial capital cost (including production set up cost) and as to the subsequent per unit manufacturing cost and which is made of structural or mechanical parts of simple construction and which are arranged for very simple and inexpensive assembly relative to the optical parts (which can be standardized for low cost manufacture)

whereby to be conducive to relatively widespread production, distribution, sale and use of the novel portable field inspection microscope of the present invention for the fiber optics cable butt end inspection purposes referred to herein or for any other substantially equivalent purpose (or purposes).

It is a further object of the present invention to provide an improved small portable lightweight field inspection microscope of the type referred to herein which is of extremely rugged construction capable of withstanding rough field usage with a minimum possibility of any damage to the instrument occurring as a result thereof.

It is a further object to provide a novel field inspection microscope of the type referred to herein which can be selectively operated so as to provide what is known as bright field illumination or what is known as dark field illumination of a fiber optics cable butt end being viewed and inspected for end surface flatness and lack of irregularities or discontinuities thereon.

Further objects are implicit in the detailed description which follows hereinafter (which is to be considered as exemplary of, but not specifically limiting the present invention) and said objects will be apparent to persons skilled in the art after a careful study of the detailed description which follows.

It is a further object to provide two subcombinations of the overall combination invention and, in the first case, comprising a dark field illuminator adapter or supplementary structure for use with pre-existing microscopes not initially provided with dark field illumination capability, and, in the second case, comprising an adaption of the forward end of the inspection microscope wherein the light provided by the illuminator means is transported by the fiber optics cable to a remote and often relatively inaccessible region—such as within a body cavity, for example—where it illuminates said remote region and causes light reflected therefrom to be picked up and relayed back (by the fiber optics cable) to within the inspection microscope, where it is viewed.

For the purpose of clarifying the nature of the present invention, one exemplary and non-specifically limiting embodiment of the invention, which is illustrative of any of the various specific forms which it may take, is illustrated in the hereinbelow-described patent drawing figures, which are described in detail hereinafter.

BRIEF DESCRIPTION OF THE DRAWINGS

FIG. 1 is a top plan view of one exemplary, but non-specifically limiting, form of the present invention and fragmentarily shows a portion of a fiber optics cable held thereby for inspection of the butt end thereof.

FIG. 2 is a side view, with certain portions in side elevation but largely comprising a vertical sectional view taken substantially along the plane and in the direction indicated by the arrows 2—2 of FIG. 1.

FIG. 9 is a bottom plan view of the upper portion of the housing only, taken substantially along the plane and in the direction indicated by the arrows 9—9 of FIG. 2.

FIG. 10 is exactly the opposite view from the showing of FIG. 9 and is a top plan view of the lower portion of the housing taken substantially along the plane and in the direction indicated by the arrows 10—10 of FIG. 2.

FIG. 11 is a fragmentary cross-sectional view of just a portion of the upper housing part only taken substantially along the plane and in the direction indicated by the arrows 11—11 of FIG. 2 and with the cross-section inverted for adjustment convenience.

FIG. 12 is a view similar to FIG. 11 illustrating a second phase in a positional and/or angular adjustment operation, the first step of which is shown in FIG. 11.

FIG. 13 is another view similar to FIGS. 11 & 12, but illustrates a third adjustment and/or locking step, the first and second of which are shown in FIGS. 11 & 12.

FIG. 14 is a fragmentary, greatly enlarged largely sectional, view of a part of the dark field illuminator means lying within the circle defined by the double-headed arrow 14 of FIG. 2 and primarily illustrates the circuit board thereof and its electrical engagements relative to the two wires of a representative one of the three dark field illuminator lamps—this non-plane showing being accomplished by displacing the plane of that portion of the view closely adjacent to the lamp shown so as to lie substantially along a plane similar to that indicated by the arrows 14—14 of FIG. 24. However, only the approximate plane (not the full structure) is shown by said arrows 14—14 of FIG. 24, inasmuch as the rest of the structure shown in FIG. 14 is not shown in FIG. 24, but is shown in FIG. 2.

FIG. 15 is an enlarged fragmentary sectional view of a portion of the bright field illuminator means shown enclosed within the double-headed arrow 15 of FIG. 2.

FIG. 16 is a fragmentary, diagrammatic, electrical schematic view primarily illustrating one representative form of electrical circuitry of the exemplary form of the invention illustrated and it physically shows the bright field illuminator means and the dark field illuminator means in entirely diagrammatic form rather than in true physical form.

FIG. 17 is a fragmentary top plan view of just the left end portion (the rear portion) of the complete apparatus as shown in top plan view in FIG. 1, but further illustrates the adjusting means, and the adjusting movement permitted and/or caused thereby, of the eyepiece lens means of the apparatus.

FIG. 18 is an enlarged, fragmentary, partially broken-away, isometric view of the charging receptacle for use in temporarily recharging the battery means when desired or needed, and illustrates it as a female receptacle without the corresponding mating exterior male phono plug adapted to be engaged therewith when a recharging operation is to be performed.

FIG. 19 is an enlarged, partially broken-away view, with certain portions in elevation and certain portions in section, of the female charging receptacle of FIG. 18 in temporary engagement with the exterior male charging phono plug adapted to provide appropriate charging DC potential to the battery means of the inspection microscope only during temporary recharging periods of time.

FIG. 19A is a fragmentary view of just the upper or forward engagement portions of the exterior male recharging phono plug of FIG. 19 showing the positive polarity and negative polarity portions thereof separated by insulation means and positioned for corresponding electrical engagement with corresponding positive and negative polarity portions of the female recharging receptacle of FIG. 18 and FIG. 19.

FIG. 20 is an enlarged, fragmentary, partially sectional and partially elevational, view of just that portion of the positive battery terminal and the biased electrical contact engaging same, lying within the circle defined by the double-headed arrow 20 of FIG. 2 and sectionally illustrates the interior details of the biasing structure thereof.

FIG. 21 is a fragmentary partially broken away view of the right end of the inspection microscope, as shown in the upper right hand portion of FIG. 2 (the top forward portion of the inspection microscope), but with the focusing means properly adjusted for placing the butt end of a fiber optics cable in a proper focusing plane for selective illumination by the bright field illuminator means, with such bright field illumination being indicated diagrammatically in FIG. 21.

FIG. 22 is a view similar to FIG. 21, but illustrates the dark field illumination means in operation and shows same diagrammatically.

FIG. 23 is a fragmentary, greatly simplified, side elevational view of just that portion of the dark field illuminator means of FIG. 22 comprising the circuit board and the three dark field illuminator lamps which are circularly angularly 120° displaced from each other. The view is substantially as indicated by the arrows 23—23 of FIG. 24.

FIG. 24 is a fragmentary diagrammatic view of the portion of the dark field illuminator means illustrated in FIG. 23 as seen in front elevation or from the right side of FIG. 23.

FIG. 25 is an enlarged, fragmentary, partially broken-away, elevational view of one representative form of fiber optics cable, and cable-holding sleeve, such as is shown at the right or front end of FIGS. 1, 2, 21 & 22.

FIG. 26 is a greatly-enlarged, fragmentary, largely-sectional, side view of the butt end of the fiber optics cable and the cable holding sleeve shown at the left end of FIG. 25 when received, engaged and held by the holder means at the front end of the inspection microscope in the manner shown in FIGS. 1, 2, 21 & 22.

FIG. 27 is a cross-sectional view taken substantially along the plane and in the direction indicated by the arrows 27—27 of FIG. 26.

FIG. 28 is an enlarged detailed view of that portion of FIG. 2 encircled by the double-headed arrow 28.

FIGS. 11–13 show the interior annular spacing enlarged to facilitate understanding of the positioning and/or tilting and locking operation of the three screws, which enlargement is not shown in other views of the drawings.

DESCRIPTION OF THE PREFERRED EMBODIMENT

Figure 3:
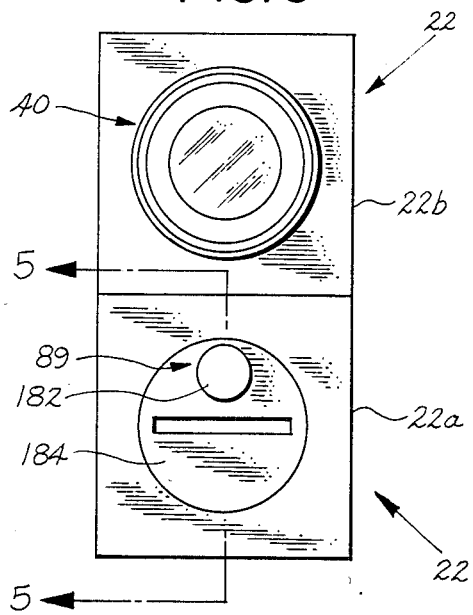
FIG. 3 is a rear end elevational view taken substantially along the plane and in the direction indicated by the arrows 3—3 of FIG. 2.
Figure 4:
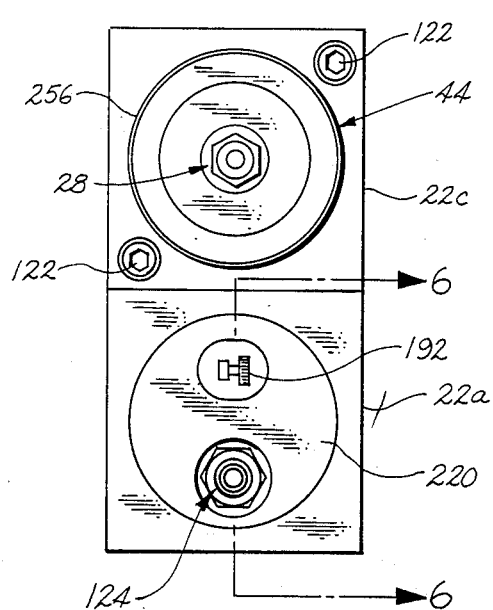
FIG. 4 is a front end elevational view taken substantially along the plane and in the direction indicated by the arrows 4—4 of FIG. 2.

Generally speaking, the portable field inspection microscope of the present invention comprises a housing provided at or adjacent to one end thereof with a butt end receiver, holder and positioner adapted to receive a butt end of a cylindrical object (usually comprising a fiber optics cable) and to position same at or coincident with a selected butt-end-surface viewing plane, which may also be referred to as a focusing plane. The housing is also provided with an optical-path-defining longitudinal (usually cylindrical) inner chamber optically communicating at a front end with the previously-mentioned butt end receiver, holder and positioner and being further intermediately provided with objective microscope lens mounting means and microscope objective lens means carried thereby and optically aligned with the receiver, holder and positioner and focusable on the previously-mentioned focusing plane. The optical-path-defining chamber is further provided at or adjacent to a rear end thereof with microscope eyepiece lens mounting means and microscope eyepiece lens means carried thereby in a longitudinally adjustable manner for focusing and for providing a desired degree of apparent visual image magnification of a butt end surface of a cylindrical object (such as a fiber optics cable or the like), being viewed and inspected while received, held and positioned in the previously-mentioned focusing plane, and with the objective lens means, the mounting means therefor, the eyepiece lens means and the mounting means therefor and said optical-path-defining chamber effectively defining an inspection microscope appropriately provided with bright field illuminator means and dark field illuminator means arranged for selective energization and direction onto a flat butt end surface of a cylindrical object (such as a fiber optics cable or the like) being viewed and inspected while received, held and positioned in the focusing plane.

In the specific representative form of the invention illustrated for exemplary, but non-specifically limiting, purposes, the entire inspection microscope referred to hereinbefore is generally designated by the reference numeral 20 (in FIG. 2), while the housing itself is generally designated by the reference numeral 22 and the front, or front end, thereof is indicated by the reference numeral 24 and a rear end thereof is indicated by the reference numeral 26.

The entire butt end receiver, holder and positioner referred to hereinbefore is indicated generally by the reference numeral 28 and the fiber optics cable adapted to be received thereby is indicated generally by the reference numeral 30 and is shown as having a butt end, or butt end surface, 32 which is the flat surface which is to be viewed and inspected by the inspection microscope 20.

In the exemplary form illustrated, the optical-path-defining longitudinal inner chamber is indicated generally at 34 and, in addition to carrying the previously-mentioned butt end receiver, holder and positioner 28 at its forward end, carries the intermediately positioned microscope objective lens means indicated generally at 36 (carried by objective lens mounting means 38), and at or adjacent to the rear end of said optical-path-defining longitudinal cylindrical inner chamber 34, it is further provided with one particular type of microscope eyepiece lens means 40 longitudinally adjustably mounted or carried by microscope eyepiece lens mounting means 42 so that the microscope eyepiece lens means 40 can be longitudinally moved for focusing and magnification adjustment purposes whereby to provide a desired degree of apparent visual image magnification of a butt end surface 32 of the fiber optics cable 30 which is being viewed and inspected while received, held and positioned in a focusing plane which is diagrammatically indicated in broken lines at 43 in FIGS. 21 & 22.

The inspection microscope 20 is effectively provided with focusing means for manually adjusting the relative longitudinal spacings between various of the lens means relative to each other and/or relative to the focusing plane 43 (in FIGS. 21 and 22) and a butt end surface 32 of a fiber optics cable 30 when it is lying in said focusing plane 43. While this focusing means may assume a variety of forms, in the specific form illustrated, it is generally designated by the reference numeral 44 and comprises an outer spirally grooved short cylindrical sleeve 46, an inner, slightly cylindrically smaller, short longitudinally grooved sleeve 48 (usually lying inside of the first sleeve 46) and a short inwardly directed transverse pin 50 carried by an adjacent portion of the housing 22 on an inner surface of a front end part of the inner chamber 34 and projecting inwardly into both the spiral groove 52 in the first-mentioned sleeve 46 and the longitudinal groove 54 in the second-mentioned sleeve 48 in a manner such that relative rotation of the outer spirally grooved sleeve 46 relative to the end of the fixed pin 50 will effectively produce longitudinal focusing movement of said pair of sleeves 46 & 48 and a butt end 32 of a fiber optics cable 30 otherwise fixedly carried within the assembly comprising the focusing means 44 by the previously-mentioned receiver, holder and positioner 28 which, in the exemplary form illustrated is centrally carried within the focusing assembly, comprising the focusing means 44 (in FIG. 21), and which can be said to be controllably operable to effectively receive and firmly hold an outer cylindrical surface part 56 of the fiber optics cable 30 immediately adjacent to the cut butt end surface 32 thereof. In the example illustrated, this comprises a clamping sleeve or fitting 58 (in FIG. 26) having a central through aperture 60 of a size and shape such as to be adapted to receive a short longitudinal or length portion 56 of the outer cylindrical surface of the fiber optics cable 30 therein with the cut or butt end surface 32 projecting a short distance beyond one end of the holding sleeve 58, which is then clamped or otherwise firmly attached to said outer cylindrical surface of the cable end portion 56 in any desired or suitable manner. The end part of the exterior of the cable-holding sleeve 58 is shown as being interiorly threaded as indicated at 62 (in FIG. 26), while a corresponding exteriorly threaded receiving bore 64 of receiving nipple 65 is centrally carried by an end wall 66 mounted on the longitudinally movable focusing assembly or means 44 and including the two concentric sleeves 46 & 48 (in FIG. 21).

Thus, it can be seen that the threaded end portion 62 of the small sleeve 58 carrying the end of the fiber optics cable 30 can be threaded onto the exterior threads 70 of the exteriorly threaded receiver 65, usually to a predetermined depth as determined by an effective stop collar or shoulder 68 (in FIG. 26) and/or 68', which is so arranged as to place the cable end butt surface 32 inwardly (or rearwardly of the focusing means 44) so it can be positionally adjusted until it is exactly coincident with the previously-mentioned focusing plane 43.

The previously-mentioned bright field illuminator means is generally indicated at 72 and also includes controllably operable electrical energizer means 74, with the whole being arranged in a manner such as to be capable of selectively controllably injecting bright field illuminating light into the optical path along an optical axis, such as is indicated in dotted lines at 76, of the optical-path-defining chamber 34 and for there redirecting the bright field illuminating light forwardly and longitudinally along the optical path (optical axis 76) toward the previously-mentioned transverse focusing plane 43 and in a direction substantially normal thereto for causing substantially directly reversed rearward reflection of bright field light from the butt end surface 32 being viewed and inspected in what is termed a bright field illuminated manner. This entire operation is best illustrated in FIG. 21.

In the example illustrated, the bright field illuminator means 72 comprises a spherical (or parabolic) reflective, or mirror, surface 78 formed or fabricated within the corresponding part and which has a small hole 80 immediately below the spherical reflector surface 78 and through which a small illumination lamp 82 can be inserted with its rear end in contact with a conductive element 84 attached electrically relative to selector switch means 86 and battery means indicated generally at 88, with the other side of said lamp means 82 being grounded as indicated at 85, as is the other side of the battery means 88 at 87 by way of the normally open, but manually closable "on-off" switch means 89. The reflector 78 reflects bright field light 91 toward, into, and at right angles with respect to, the previously-mentioned optical path (along the optical axis 76) of the chamber means 34 and onto what might be termed bright field light redirecting means, indicated at 90 and, in the example illustrated, comprising an angularly positioned partially light-transmissive and partially light reflective, partially silvered mirror means 92 (or prism means or other beam splitter means of an equivalent nature) adapted to turn the bright field illumination light 91 at right angles so as to be aimed directly forwardly onto the cable butt end surface 32 (and for direct rearward reflection of the light, as indicated at 93BF) for effective bright field illumination inspection thereof, as is most clearly shown in FIG. 21.

The dark field illuminator means is generally designated by the reference numeral 94 and, in the specific representative example illustrated, comprises what might be termed an annularly arranged light ring (light-ring defining means) 96 (in FIG. 22) positioned in the optical-path-defining chamber 34 (in FIG. 2) at a forward location and arranged to forwardly direct an annular ring of light 98 (in FIG. 22) forwardly along the inside of a forwardly converging (usually parabolically shaped) mirror 100, which may be said to comprise one form of reflector means and which terminates in a frontally positioned circular aperture 96 provided by annular-slot-defining means 104 so arranged as to redirect the previously forwardly directed annular light ring 98 in an inward angular oblique manner where as to cause virtually all of the rays of light provided by the annular ring of light 98 to be centrally forwardly and sharply angularly redirected onto the focusing plane 43, and the flat fiber optics cable butt end 32 positioned therein, so that it can be said that in the dark field illuminating mode of operation virtually all of the illuminating rays of light incident upon the flat butt surface 32 are so angularly directed that when reflected from flat portions thereof, as diagrammatically indicated at 102, they will also be at sharply angular orientations with respect to the butt end surface 32 such that they will not be reflected back along the optical-path-defining chamber 34 through the inspection microscope 20 the the eye of a person looking into the eyepiece lens means 40.

Only surface irregularities or discontinuities on the flat butt end surface 32 being inspected will be able to reflect back rays of light directly therefrom through the inspection microscope 20 the eye of a person looking into the eyepiece lens means 40, as indicated diagramatically at 93DF. This is the so-called dark field mode of illumination.

In the specific example illustrated, the so-called annularly arranged light ring (light-ring-defining means) 96 further includes ring-of-light producing means 97 shown as comprising a plurality(three in the example illustrated) of circularly angularly spaced, forwardly directed, small, electrically-energizable lamp means 106 on a forward surface of a circularly shaped piece of printed circuit board, indicated generally at 107, which of course, has a conductive front surface 108 and a conductive back surface 110 insulatingly separated from each other by an intermediate insulating circuit board base material 112. The arrangement is such that one electrical terminal of each of the three lamps 106 can be electrically connected to the front conductive material 108, which in turn, can be edge-connected to the metallic mounting (outer shell) material 109 of the portion of the non-grounded cylindrical mirror housing 111 mounting same, while inwardly insulated by an annular air space 113 from the metallic barrel 115 of the objective lens 36, which is grounded. The rear sheet of conductive material 110 (in FIGS. 14 and 28) can be edge milled or otherwise removed in an outer annular circle to just such an extent as to prevent it from electrically contacting the metallic mounting material 109 of the portion of the mirror housing 111 in which it lies. The other terminal of each of the lamps 106 can be electrically connected to said rear conductive sheet 110 which in turn, has a spring 114 pressing against same at its front end and, at its opposite end (or along its inner surface) being in electrical contact with said grounded barrel member 115. The first-mentioned terminal of each of the three lamps 106 is connected, by way of the front conductive material 108, the metallic outer shell 109 of the mirror housing 111, and a spring-biased electrical contact 117 in engagement therewith, to the slide-action selector switch means 86 and, by way thereof, to the non-grounded positive terminal 119 of the batteries 88 (which, of course, have their opposite terminals effectively grounded by way of the "on-off" switch means 89.

The arrangement just described and illustrated is exemplary only of one particular arrangement which will make it possible to operate the slide action selector switch 86 into a position adapted to selectively energize either the previously-mentioned bright field illuminator means 72 or the just-described in detail dark field illuminator means 94 (whenever the "on-off" switch means 89 is manually closed for selecting whichever illumination mode of operation of the inspection microscope 20 a would-be user desires.

The annular slot-defining means 104 of the dark field illuminator means 94 includes the threadedly longitudinally shiftable outer shield portion 111 which can be adjusted (usually in an effectively longitudinally shiftable manner) for controllably longitudinally shifting the plane of maximum concentration of the angularly obliquely directed dark field illumination rays of light 98 so that said plane of maximum concentration can be made to be substantially coplanar and coincident with the previously-mentioned focusing plane 43.

Incidentally, it should be noted that a helical biasing spring 45 is positioned immediately in front of the forward end of the mirror-carrying shield and housing 111 and immediately behind and inside of the end wall 66 of the focusing means 44. Also, it should be noted that an insulating spacer 47 is carried by the front end of the mirror housing and shield 111 so as to prevent it from being grounded to the housing 22 by the biasing spring 45 whenever the selector switch 86 is moved into the dark field illuminating selection position shown in solid lines in FIG. 16 and whenever the manually operable "on-off" switch 89 is temporarily closed to ground the battery means 88. This insulating spacer 47 thus becomes important, because otherwise, it would ground the positive polarity mirror housing and shield 111 and would thus prevent energization of the dark field illuminator lamps 106. The smaller end of the helical biasing spring is positioned at its rear while the larger end thereof is positioned at its front. This causes the rear end of the helical spring 45 to lie directly against the insulating spacer 47 for the purposes previously noted, while the front end of the spring 45 against a ring shaped groove in the rear surface of the end wall 66 of the focusing means 44 which thus causes the inner sleeve 48 to always be biased as far forwardly as is permitted by the pin 50 in engagement with the straight groove or slot 54 and/or the position of the outside sleeve 46 as determined by the orientation of its spiral groove 52 relative to the pin 50.

The construction of the entire housing is made simple to manufacture and simple to assemble by providing it in the form of three housing parts, a lower or first one of which is indicated at 22a, and which carries the batteries 88 for both the bright field illuminator means 72 and the dark field illuminator means 94, and further including the selector switch means 86, the "on-off" switch means 89, and the various other interconnecting elements of the electrical circuitry.

The housing 22 also includes a second housing part 22b by several vertical through-bolts or screws, such as indicated at 120 (usually socket head screws such as Allen screws or the like), and said second housing part 22b has the optical-path-defining inner chamber 34 largely formed therein (such as by being machined out or otherwise fabricated) and also carries the entire inspection microscope optical parts. It also carries major portions of the bright field illuminator means 72 exclusive of the contact 84, the two switches 86 & 89 and the batteries 88, carries virtually all of the dark field illuminator means 94, again exclusive of the battery means 88, the contact 117 and the two switches 86 & 89.

The second housing part 22b is shorter from end to end than the corresponding length of the first-mentioned housing part 22a and the open space which would thus be provided is filled by a third housing part 22c which is fastened by longitudinal fastening screws 122 at the forward end of the second housing part 22b and immediately above the corresponding front end portion of the first-mentioned housing part 22a and it carries both the previously-mentioned cable butt end receiver, holder and positioner 28 and the previously-mentioned focusing means 44.

Thus, it can be seen that a very simple-to-manufacture, simple-to-assemble and simple-to-disassemble construction has been provided and any time that maintainence or service work is needed or replacement of any of the batteries or lamp means is required, it is only necessary to unscrew the corresponding fastening screws 120 and/or 122 and to disassemble the three housing parts which will provide complete interior access to any and all portions of the complete apparatus in need of repair, adjustment and/or replacement, after which, it is only necessary to reassemble same within the three housing parts and to again fasten and tighten the sets of screws 120 and 122 in order to place the complete device in fully operative condition again.

It should be noted that while the electrical energizer means 74, which is shown as comprising multiple series-connected batteries 88, and while these batteries may be of any appropriate type, it is preferable to use batteries of a rechargeable type, such as nickel-cadmium batteries, or the like, or any other type of battery capable of being recharged, which can be connected by way of plug receptacle 124 to any convention source of AC power, which can be fed through a rectifier means (not shown since such is well-known in the art) and then applied to the batteries 88 for recharging them during periods of non-use so that whenever the device is to be used, the batteries will be fully charged. Of course, the rectifier means can be provided with appropriate voltage-sensitive (or other electrical parameter-sensitive) (or responsive) regulator means for terminating such battery-charging operation whenever the batteries are fully charged, if desired.

It should be noted that the previously-mentioned threadedly longitudinally shiftable adjustment of the outer shield portion 111 carrying the reflective mirror 100 therein is accomplished by reason of the fact that the inside rear end of said shield portion 111 is interiorly threaded as indicated at 126 and is adapted to be threaded onto corresponding exterior threads 128 of a plastic insulating ring or sleeve 121 which is carried on the exterior of the barrel 115 of the objective lens means 36. This arrangement not only provides for the above-mentioned effective longitudinal shifting of the outer shield portion 11 relative to the front end of the objective lens means 36, but also effectively electrically isolates and insulates the electrically conductive (usually metallic) outer shield portion 111 from the electrically conductive barrel 115 of the objective lens means 36 which is effectively electrically grounded at its rear end by being threadedly mounted and engaged as indicated at 123 with respect to an electrically conductive (usually metallic) mounting ring 129 (which is electrically grounded by way of the walls of the housing 22), whichcan be said to effectively comprise the previously-generically-mentioned objective lens mounting means indicated generally at 38.

The electrical isolation provided by the threaded plastic outer sleeve or ring 121 is important, because the spring biased contact 117 carrying the positive potential from the batteries 88 is in direct exterior electrical engagement with said outer shield portion 111 and this isolation from the grounded barrel 115 of the objective lens means 36 provides for a non-shorted circuit through each of the three dark field illumination lamps 106 whenever the "on-off" switch 89 is manually closed and whenever the selector switch 86 is operated into the dark field selection alternate position shown in solid lines in FIG. 16.

Alternatively, it should be noted that whenever the above-mentioned selector switch 86 is operated into its other, bright field, illumination selective position, as shown in broken lines in FIG. 16, the positive battery potential is applied alternatively through the other spring biased contact 84 to the electrically conductive member 130 on the bottom side of the circuit board structure 132, best shown in FIG. 15, which connects the positive potential to one side of the lamp 82, while the other side of the lamp 82 is grounded by way of the upper metallic coating or layer 134 on the top side of the circuit board 132 as shown in FIG. 15, with the two conductive elements 130 & 134 being effectively electrically insulated from each other by an intervening sheet of insulating material 136. The outer periphery of the upper conductive layer 134 is effectively grounded at its outer edge to the circular edge wall 138 (which is electrically conductive) and which is in conductive contact with walls of the housing 22. Of course, for the complete circuit to be closed, it is necessary for the "on-off" switch 89 to be manually closed (effectively closing the ground side of the circuit.)

In the arrangement described immediately hereinbefore, it will be noted that the entire bright field illuminator means 72 and the entire dark field illuminator means 94, as well as the objective lens means 36, are all effectively carried by the generically referred to objective lens mounting means 38. This is done in a specific and particular way in the example illustrated, primarily for reasons of simplicity of construction and assembly, but the invention is no specifically so limited in all forms thereof.

In the example illustrated, the mounting ring 129 is positioned within the cylindrical bore comprising the previously-mentioned optical-path-defining longitudinal cylindrical inner chamber 34 and said mounting ring or sleeve 129 is positioned in said bore 34 for slight lateral shifting or tipping movement (primarily for optical centering and alignment purposes) by multiple Allen screws 140 and/or a set screw 142. It should be noted that the two angularly oriented Allen screws 140 extend through the wall 144 of the mounting ring or sleeve 129, so as to abut the inside surface of the longitudinal bore 34 at angularly spaced locations, while the set screw 142 abuts the exterior of the mounting ring 129 at a different angularly displaced location and is threadedly mounted in the wall of the bore 34 itself.

It should also be noted that oppositely angularly positioned access holes 146 extend through both the wall of the mounting ring 129, and corresponding parts of the wall defining the bore 34 so as to make it possible to insert an Allen wrench, such as is indicated at 148 in FIGS. 11, 12, and 13, through either or both of said access holes and into engagement with the corresponding one of said positioning Allen screws 140 so that either or both can be tightened (as can the set screw 142) for slightly shifting and/or tipping the center of the mounting ring 129 (primarily for optical alignment purposes) and also for firmly locking the entire mounting ring 129 in the proper position.

It should also be noted that the previously-mentioned bright field illuminator means 72 comprises the cylindrical outer electrically conductive sleeve 138 having an opend end 150 at its rear into which the previously-mentioned spherical parabolic mirror 78 is inserted, with the bright field lamp 82 centrally positioned and extending forwardly through a central hole in the mirror so that bright field light 91 will be projected along the length of the interior of said cylindrical sleeve 138 at right angles to the longitudinal axis 76 of the bore 34. The entire bright field sleeve 138 is laterally inserted through a lateral circular hole 151 in the wall of the bore 34, and alinged corresponding holes 152 in the previously-mentioned mounting ring 129 of the objective lens mounting means 36. The cylindrical sleeve 138 has two oppositely positioned laterally aligned holes 154 and an angularly positioned light re-directing means 90 (shown as a 45° half-silvered mirror 92) positioned angularly across the inside of the bright field illuminator sleeve 138 so that the optical axis of the bore 34 will pass directly through the alinged holes 154 and the center of the angularly positioned mirror 92.

The previously-mentioned positioning and adjusting screws 140 & 142 allow the entire carrying ring 129 to be shifted so that both the angular half-silvered mirror 92 and the objective lens means 36 can be slightly shifted or tilted for proper optical alignment with the previously-mentioned eyepiece lens means 40 and the butt end 32 of the fiber optics cable which is to be inspected.

In the example illustrated, the eyepiece lens means, indicated generally at 40, is also adjustably mounted in the bore hole 34 at the rear end thereof by the previously-mentioned eyepiece lens means mounting means indicated generally at 42.

In the exemplary, but non-specifically limiting form illustrated, the eyepiece means 40 consists of an eyepiece-lens-carrying inner barrel portion 156, which interiorly carries an eyepiece lens means of a standard type and which is provided with exterior threads 158 cooperating with an outer eyepiece lens rear barrel portion 160, having an inwardly directed screw 162, and with said rear outer barrel portion being provided with a longer forward barrel portion 164 which has a forward slightly larger diameter retaining or flared end 166 at the front thereof which surrounds the forward end of the hollow interior of the lens-carrying barrel along the rear portion of the light-defining path lying within the bore 34. Immediately around the exterior of the forward outer barrel portion 164, an outer mounting plastic sleeve 168 is positioned and is arranged to frictionally engage the outer periphery of the barrel portion 164 so as to normally hold same in a selected position but to allow positional readjustment by the application of a small degree of force manually applied to the rear end of the rear outer barrel portion 160. The plastic outer sleeve 168 is adapted to be forced into a tight press-fit relationship within the bore 34, where it will normally stay be reason of its press-fit engagement therewith. However, retaining screw means, such as indicated at 170, may be arranged to be screwed against the outer periphery of the locking outer plastic sleeve 168 to firmly lock it in any selected position if desired. There is also a rear retaining ring 172 which is adapted to be positioned on the forward outer barrel portion 164 in abutment with the rear end edge of the outer plastic sleeve 168 and, inasmuch as the rear outer barrel portion 160 is slightly larger in diameter than the forward outer barrel portion 164, this causes the ring 172 to act as a stop shoulder limiting forward movement of the eyepiece means 40 to a position such as is shown in FIGS. 1 & 2, where the ring 172 is in contact with the rear edge of the fixed outer plastic sleeve 168 and the slight shoulder at the forward end of the rear outer barrel portion 160 is in contact with said ring 172. The ring 172 may be frictionally positioned within the extreme rear end of the bore 34, or optionally, it may additionally be provided with set screw means 174 for positively locking it in place if desired.

The eyepiece lens means mounting arrangement described immediately hereinbefore allows adjusting movement of the entire assembly of the inner barrel 156, the rear outer barrel portion 160 and the forward outer barrel 164 by longitudinally moving same against the frictional retaining force exerted on the periphery of the forward barrel portion 164 by the fixed mounting plastic sleeve 168. Additionally, the inner barrel portion 156 carrying the rear part of the eyepiece lens means therein can be threadedly advanced or retracted relative to the rear outer barrel portion 160 in a manner indicated by the rotation arrow 176 in FIG. 17 which will produce relative longitudinal movement thereof in the manner of the longitudinal movement arrow 178 of FIG. 17.

The electrical circuitry described in part hereinbefore is schematically shown in FIG. 16 and shows the three batteries 88 of FIG. 2 in composite schematic form at 88, with the schematic positive terminal being indicated at 119 and corresponding to the central positive terminal shown projecting from the right end of the right one of the three batteries 88 of FIG. 2. The negative terminal of the composite battery 88 is indicated at 180 in FIG. 16 and corresponds to the left battery casing end wall of the left battery 88 of the three batteries shown in FIG. 2.

Figure 5:
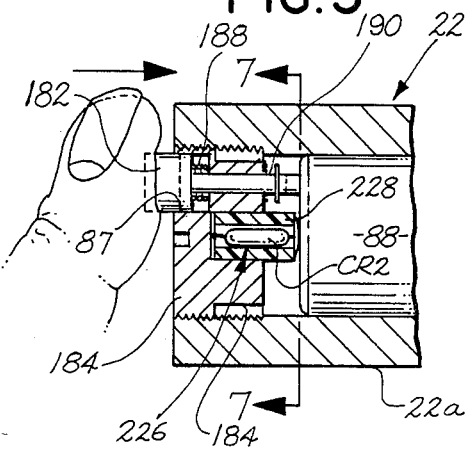
FIG. 5 is a fragmentary vertical sectional plane view of just the lower portion of the housing taken substantially along the plane and in the direction indicated by the arrows 5—5 of FIG. 3.
Figure 6:
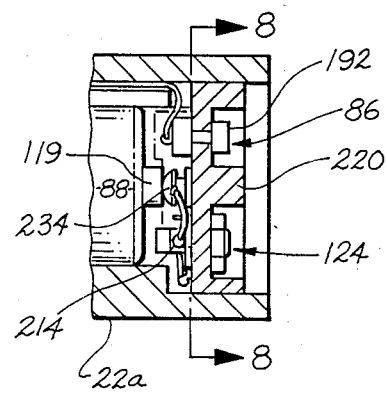
FIG. 6 is a vertical sectional plane view of just the lower portion of the housing taken substantially along the plane and in the direction indicated by the arrows 6—6 of FIG. 4.
Figure 7:
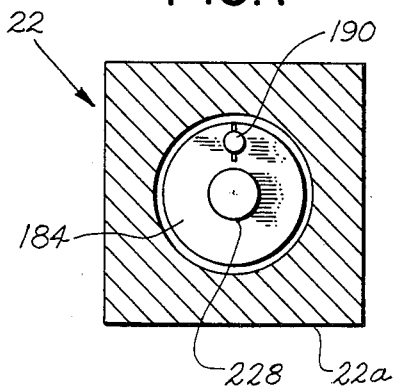
FIG. 7 is a fragmentary cross-sectional view taken substantially along the plane and in the direction indicated by the arrows 7—7 of FIG. 5.
Figure 8:
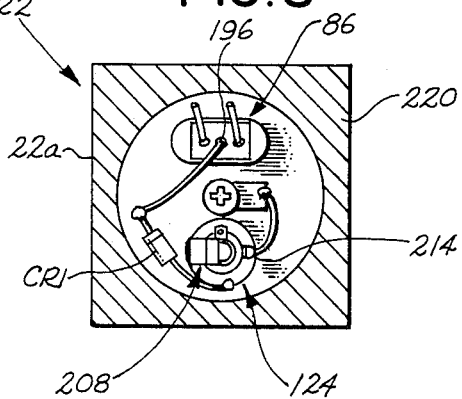
FIG. 8 is a fragmentary cross-sectional view taken substantially along the plane and in the direction indicated by the arrows 8—8 of FIG. 6.

The previously-mentioned "on-off" switch 89 shown at the left end of the bottom housing portion 22a of FIG. 2 is illustrated schematically in FIG. 16 and is shown to comprise a pushbutton 182 carried in the rear end plug 184 closing the rear end of the battery carrying chamber 186 lying within the lower housing portion 22a. The push-button switch is normally spring biased rearwardly into a switch-open position by biasing spring means 188, best shown in FIG. 5. It also has a by-passing electrically conductive portion 190 which can be manually moved so as to close the battery circuit to ground until it is manually released. As physically shown in FIG. 5, this comprises moving the electrically conductive grounding member or rod 190 forwardly by the pressure of a user's thumb so as to electrically contact the rear end wall 180 (the effective negative terminal 180) of the rear-most one of the three batteries 88 (the composite battery 88 shown schematically in FIG. 16.) This immediately grounds the batteries, or composite battery 88, as is schematically indicated at 87 in FIG. 16, and thus, either the bright field illuminator means 72 or the dark field illuminator means 94 is now connected to the previously-isolated and now grounded negative terminal 180 of the batteries 88 (or composite battery 88 of FIG. 16.)

The determining factor as to whether (or no) temporary manual closure of the "on-off" swtich means 89 energizes the bright field illuminator means 72 or the dark field illuminator means 94 is provided by the position of the selector switch means 86. Said selector switch 86 has an outer operating button 192 which can move the inner switch element 194 so as to contact and close the circuit between central hot lead terminal 196 and either the bright field terminal 198 or the dark field terminal 200. Said selector switch is preferably, although not necessarily, of a snap action type (with mechanical structural details not being shown since such are well-known in the art.

As illustrated, the selector swtich 86 is shown in the position selecting the dark field illuminator means 94 for energization by the "on-off" switch means 89. This is shown in solid lines in FIG. 16, while the alternate position of the selector switch 86 for controllable energization of the bright field illuminator means 72 is shown in broken lines in FIG. 16. The diode CR1 shown between the positive battery terminal 119 and the central hot lead terminal 196 of the selector switch 86 is provided primarily for the purpose of reducing the voltage applied by the battery means 88 to either the lamp 82 of the bright field illuminator means 72, or the three lamps 106 of the dark field illuminator means 94 to a proper controlled voltage and, in certain forms, may comprise a zener diode.

Inasmuch as the battery means 88 can be expected to become discharged after considerable period of usage time has elapsed and after many energizations of the bright field illuminator means 72 and/or the dark field illuminator means 94 have occurred, provision may be made for recharging the battery means 88 which, should be of a readily rechargeable type where such recharging means is to be provided. In the example illustrated, said recharging means is indicated generally at 202 in both the electrical schematic showing of FIG. 16 and the physical showing of physical parts thereof as shown in FIGS. 2, 4, 6, 8, 18 & 19.

The recharging means indicated generally at 202 comprises a male plug (a so-called phono plug) indicated generally at 204, and the previously-mentioned plug receptacle or receiver indicated generally at 124 arranged so that whenever the plug 204 is completely removed from the plug receptacle or receiver 124, the circuitry is as previously-described and as is most clearly shown in electrical schematic form in FIG. 16, wherein the isolating switch 208 is normally closed in the manner shown schematically in FIG. 16 and physically in FIG. 18, thus closing the circuitry connecting the negative battery terminal 119 to either the bright field illuminator means 72 or the dark field illuminator means 94, depending upon which has been selected by the selector switch means 86 so that temporary manual closure of the "on-off" switch means 89 will cause corresponding energization of either the bright field illuminator means 72 or the dark field illuminator means 94 as previously described. However, when the plug 204 is inserted into the plug receiver or receptacle 124, and an appropriate low voltage DC recharging potential is to be applied for recharging the battery means 88, as shown schematically in FIG. 16 and physically in FIG. 19, the electrical arrangement is changed because the electrically isolated positive forwardly projecting center post 210 of the plug 204 functions as a cam and strikes a projection 212 which functions as an effective cam follower, all in a manner which opens the previously closed isolating switch 208 from the closed position thereof shown physically in FIG. 18 into the open position thereof shown physically in FIG. 19 and schematically in FIG. 16.

Inasmuch as the switch terminal 214 is connected to the positive battery terminal 119 and is connected to the cam follower switch arm 212, which is temporarily out of engagement with the switch element 209 normally engaged thereby and directly connected to terminal 211 leading to the positive polarity central terminal 196 of the selector switch 86, it will be seen that this corresponds to the schematic showing of FIG. 16 where the positive battery terminal 119 is effectively disconnected entirely from the selector switch 86 and thus, is temporarily disconnected entirely from either the bright field illuminator means 72 or the dark field illuminator means 94 during a recharging period and until the recharging period is over, and the plug 204 is withdrawn from the plug receiver or receptacle 124, at which time, the switch 208 automatically again closes, placing the positive battery terminal 119 again in a series connected situation with respect to the selector switch 86. However, it should be clearly noted that during the above-described temporary recharging period, the positive polarity, forwardly projecting cam element 210 of the male plug 204 is definitely temporarily electrically connected to the cam follower portion 212 and thus, by way of the terminal 214, is temporarily directly connected to the positive battery terminal 119 for effectively recharging same during a temporary recharging period (usually with a low DC recharging voltage derived from a conventional step down transformer and rectifier connected to the conventional alternating current available and not shown since such are well-known in the art.)

It will be noted that it is also necessary for the negative outer sleeve portion 216 of the recharging plug 204 to be connected to ground and for the effective negative battery terminal 180 to be connected to ground during the temporary recharging period in order for the recharging operation to be effective. In the case of the negative potential recharging male plug outer sleeve portion 216, this is accomplished when it is plugged in as shown in FIG. 19 by the reason of the fact that it touches the central conductive sleeve portion 218 of the receptacle 124 which can be either grounded directly to the metallic end plug casing wall 220, or can be grounded thereto by way of the grounded terminal 222. This is indicated schematically at 224 in FIG. 16. In the case of the effective negative battery terminal 180, this is accomplished by way of a voltage-responsive effective shunting means, indicated diagrammatically at 226, and comprising a spacing sleeve 228 of insulating material, such as plastic or the like, having a voltage-responsive by-passing zener diode CR2 passing therethrough and electrically connected at its forward end to the negative battery terminal 180 and electrically connected at its rear end to the metallic wall portion 184 of the rear threaded end cap carrying the push-button switch.

The recharging voltage applied is made sufficiently great to cause the zener diode CR2 to conduct temporarily during the recharging period only, thus effectively temporarily closing the ground side of the recharging circuit. As soon as the recharging operation ceases, and the recharging plug 204 is withdrawn from the receptacle 124, it will be found that the battery potential provided by the battery means 88 is insufficient to cause conduction to occur through the zener diode CR2, thus effectively opening the ground circuit until the previously-described "on-off" switch 89 is temporarily manually closed to energize either the bright field illuminator means 72 or the dark field illuminator means 94.

The various portions of the recharging receptacle 124 described above are spaced from each other and electrically insulated and isolated from each other by layers of insulating material, as indicated by the number 232 in each case. This number also applies to the "O"-ring insulator on the male plug 204.

In order to facilitate maintaining positive contact of each battery negative rear end wall with the rearwardly adjacent center positive terminal of the next rearwardly adjacent battery 88, and in order to maintain positive contact of the forward center positive composite battery terminal 119 with a terminal 234 carried by the forward end wall cap 220, it is arranged in a spring biased fashion for constant pressure therebetween. This is best shown in fragmentarily enlarged form in FIG. 20 wherein the forward positive battery terminal 119 is shown in abutment with a screw head 234 which is slideably mounted in a hollow insulating plastic sleeve 236 and which has a biasing spring 238 positioned between the forward side of the screw head 234 and a centrally apertured insulating webbing 240 positioned inside of the plastic sleeve 236. The forward end of the screw head 234 is threaded at 242 and carries a conventional threaded nut 244 which acts as a retainer. The arrangement is such that the floating contact 234 is able to move in the manner indicated by the double-headed directional arrow 246 to provide for appropriate spring biasing forced contact to exist between the positive battery terminal 119 and the floating contact member 234.

FIGS. 25 through 27 illustrate one exemplary form of the fiber optics cable, indicated generally at 30, and show it as being of the type having a single centrally-positioned light-transmissive fiber portion 250 surrounded by cladding material 252 having a different, and usually lesser, index of refraction than the fiber 250. The means by which the fiber optics cable 30 is mounted in the holding speeve 58 is partially illustrated in FIG. 26, but may assume a variety of forms, including clamping arrangements, set screw arrangements, constrictable split sleeve arrangements, even integrally attached arrangements. This is relatively unimportant, since it does not touch upon the real inventive concept of the present invention.

Also, in the exemplary but non-specifically limiting form illustrated, a stiffening sheath 254 is indicated and may be employed for stiffening just the projecting butt end portion of the fiber optics cable 30 so it can be more easily inserted into and mounted in the receiver, holder and positioner 28. However, it should be noted that in certain forms, this may be modified or eliminated entirely. It should be noted also that the fiber optics cable 30 may be of the type having more than one light-transmissive optical fiber 250 positioned within the cladding material 252 and that all such arrangements are included within the broad scope of the present invention.

The focusing means 44 is shown in FIGS. 1, 2, & 9, in its extreme rearwardly adjusted position, while FIGS. 21 & 22 illustrate it adjusted into a somewhat forwardly displaced position, which, it should be understood, can be displaced even more forwardly than the partially forwardly displaced relationship of the focusing means 44 shown in FIGS. 21 & 22. The focusing movement of the focusing means 44 is provided by manually grasping the knurled exterior knob 256 and turning said exteriorly knurled end knob 256 of the focusing means 44 in either a counterclockwise direction as viewed in FIG. 4 which will cause the spiral groove 52 in the outer sleeve 46 of the focusing means to spirally move either outwardly (forwardly) or inwardly (rearwardly) relative to the fixed lateral pin 50. The inner sleeve 48 of the focusing means will move longitudinally (but not rotatively) in correspondence with the rearward or forward movement of the outer sleeve 46 under the biasing force exerted against the end wall 66 by the biasing spring means 45. Inasmuch as the fiber optics cable holder means 28 is fixedly carried in the end wall 66, this will correspondingly move the held butt end 32 of the fiber optics cable 30 forwardly or rearwardly until it exactly coincides with the previously-mentioned focusing plane 43.

The adjusting movement of the eyepiece lens means 40 is best indicated in FIG. 17 wherein rotation of the extreme rear portion 156 thereof in either a counterclockwise direction or a clockwise direction will cause corresponding rearward or forward movement of the inner optical lens means carried thereby for providing a desired degree of apparent visual image magnification of the butt end 32 of the fiber optics cable 30.

It should also be noted that the present invention is additionally directed to the concept of a dark field illuminator additive and/or convertor structure for use with conventional microscope objective lens means which originally were not provided with dark field illuminator means. This would be done in a manner similar to the showing of the dark field illuminator means 94 and such will be specifically disclosed and claimed.

It should also be noted that the present invention is additionally directed to the concept of a small portable inspection microscope having remote inspection region extension means coupled thereto and capable of being extended into some otherwise inaccessible region which it is desired to inspect and to there pick up an image of the desired inaccessible remote region and then return it to the inspection microscope for viewing in a manner similar to that described hereinbefore. In other words, in this concept, the image to be viewed is displaced from the focusing plane 43 to some remote inaccessible location—perhaps within a body cavity or the like-—and light from the bright field illuminator means 72 or the dark field illuminator means 94 is transmitted by one light-transmissive fiber to the remote inaccessible location which is illuminated thereby and reflects an image thereof which is picked up by remote optical means (usually involving very small lens means) and is returned (usually by a second optical fiber within the cable) back to the normal focusing plane 43 within the inspection microscope for direct viewing through the eyepiece means 40.

In certain applications of the inspection microscope for inspecting fiber optics cables, it may be thought desirable to increase the magnification of the image produced by viewing the butt end of a monomode type fiber optics cable having an extremely small diameter central light-transmissive optical fiber surrounded by cladding material. This may be necessary because of the de creased diameter of such a monomode optical fiber and this usually requires that the objective lens means be of a greater magnifying power which in turn, shortens the requisite distance between the front end of the objective lens means 36 and the focusing plane 43 where the butt end 32 of the fiber optics cable 30 must be positioned. If this distance becomes shorter than would be permitted because of the inclusion of the compression spring 45, a different tension spring biasing arrangement may be employed in lieu of the compression spring 45 which will allow the focusing distance to be shortened to any desired degree. One such exemplary, but non-specifically limiting, tension spring arrangement may comprise the provision of additional through-holes in the small top front housing portion 22c similar to those now provided at two diagonally opposite corners thereof for the longitudinal fastening screws 122, but in the other two diagonal corners, and with tension springs inserted therethrough and connected at their front ends to the pierced shanks of two rivets or the like inserted in said two additional through-holes, and with the rear ends of said two tension springs connected inwardly of the front housing portion 22c to an outward flange (radially outwardly extending flange) carried within the front housing portion 22c by the inner sleeve 48 (such as by having the conventional loops at the rear ends of the two tension springs looped over corresponding radially directed set screws mounted in such a flange attached to the inner sleeve 48, or other functionally equivalent arrangement), and with the appropriate clearance space for said structure being machined out of the inside wall of the small front housing portion 22c. This tension springing arrangement will function essentially the same as the prior compression springing arrangement, but will eliminate clearance problems.

It is also possible to arrange for inside clearance in a manner other than machining out the inside wall of the small front housing portion 22c by merely providing two radial outwardly extending portions (or ears) at the inner or rear end of the inner sleeve 48 of the focusing means 44 lined up with the two new or additional angularly disposed through-holes carrying the two tension springs and if desired, having said two outwardly extending portions (or ears) provided with radial screws if desired in the manner previously-mentioned and with corresponding longitudinally directed clearance slots being provided on the inner surface of the housing at the two angularly disposed locations of said two ears so as to provide clearance space for longitudinal movement thereof under the action of the two tension springs. This is functionally equivalent to the first-mentioned tension spring arrangement, but is structurally different in a very minor way, which may be more convenient under certain circumstances. This type of outwardly extending flange or pair of ears carried by the rear end of the inner sleeve 48 may also make it possible to use a larger diameter compression spring between the rear side thereof and some other fixed location rearwardly thereof outside of the mirror mounting structure 111 and the inner objective lens means 36 so that there will be no compression-spring-caused clearance problem in the central region directly between the front end of the objective lens means 36 and the focusing plane 43. All such arrangements are intended to be included and comprehended herein and, while thought to be fully and adequately disclosed by the foregoing description, will be correspondingly illustrated if this is thought necessary or desirable.

In certain applications of the inspection microscope, it is desirable to view the butt end 32 of the fiber optics cable 30 while the central light-transmissive optical fiber 250 (best shown in FIGS. 26 & 27) is illuminated. For example, during bright field illumination of the butt end 32, such independent illumination of the light-transmissive fiber 250 will provide substantial contrast to the eye of a viewer, and other reasons for providing such independent illumination of the optical fiber 250 also exist. Where this is desired, a slight modification of the bright field illuminator, indicated generally at 72, is one representative way of accomplishing this and a non-limiting exemplification thereof would comprise the piercing of the upper wall of the upper housing portion 22b as viewed in FIG. 2 at the remote upper end of the cylindrical sleeve 138 mounted in the mounting ring 129 and the upper portion 22b of the housing 22, and providing a closure plug for an aligned circular hole positioned at the opposite end of the sleeve 138 from the bright field illuminator lamp 82, with said closure plug preferably being threaded for closing off the hole just mentioned, although other engagement arrangements may be employed in lieu of threads, and with the closure plug being provided with optical cable-input-end-receiver means substantially the same as the already-described one shown at 28 and being mounted in said closure plug (or in an interchangeable replacement closure plug.) Such an arrangement will make it possible to mount the butt end (a so-called input end) of a fiber optics cable in such a closure plug in the top wall of the upper housing portion 22b in direct line with the bright field illuminator lamp 82, which when energized as previously described, reflects a portion of the light at a 90° angle onto the previously-mentioned butt end 32 of such a fiber optics cable having said butt end (in the example illustrated, an effective output end) carried by the previously-described cable-end-receiver 28. However, the important point to note is that only a part of the light (usually approximately one-half of the light) from the bright field illuminator lamp 82 is reflected by the redirecting mirror 92, while the remainder of such light (also usually one-half of the light from the bright field illuminator lamp 82) passes completely through the half silvered mirror 92 and will impinge directly on such a fiber optics cable input end mounted in a receiver similar to that previously-described at 28 and carried in such a closure plug closing off the upper wall of the upper housing portion 22b at the opposite or upper end of the sleeve 138 from the bright field illuminator lamp 82 and in direct line therewith. If desired, intermediate optical focusing means may be employed therebetween, but in any case, it will be noted that the light passing directly through the mirror 92 from the bright field illuminator lamp means 82 will impinge on the so-called input fiber optics cable and will act as an independent input light source supplying light in an input fashion to the central optical fiber 250 which will then be transmitted to the other butt end 32 of the fiber optics cable 30 in the focusing plane 43 where the viewed end of the central light-transmissive fiber 250 will be illuminated independent of the light directly incident on the butt end 32 and reflected directly rearwardly therefrom in the previously-described bright field illuminating mode of operation of the apparatus.

Thus, it will be seen that the hereinbefore-described means for independently illuminating the central optical fiber provides one representative, but non-specifically limiting structural arrangement for accomplishing this desired end, and while thought to be fully and adequately disclosed by the foregoing description, will be correspondingly illustrated if this is thought to be necessary or desirable.

Also, it should be noted that means can be provided, and are within the broad scope of the present invention, for selectively isolating and/or rendering independently operable either of the two previously-described forms of operation of the bright field illuminator means. This merely requires the effective elimination of, trapping of, or isolation of the direct rays from the bright field illumination lamp means 82 and those rays therefrom reflected by the mirror means 92. This may be done by moving or tilting the mirror means 92 physically or by optical means, and all such are intended to be included and comprehended within the scope hereof.

It should be understood that the figures and the specific description thereof set forth in this application are for the purpose of illustrating the present invention and are not to be construed as limiting the present invention to the precise and detailed specific structures shown in the figures and specifically described hereinbefore. Rather, the real invention is intended to include substantially equivalent constructions embodying the basic teachings and inventive concept of the present invention.

What is claimed is:

1. A portable field inspection microscope for inspecting a butt end surface of a cylindrical object, such as a fiber optics cable, having both a butt end and a butt-end-surface, which is to be inspected, comprising: a housing means provided with a butt-end-receiver, holder and positioner for receiving and holding and positioning a butt end, and a butt-end-surface of a cylindrical object, such as a fiber optics cable, in a location and position such as to cause the butt-end-surface to be coincident with a selected butt-end-surface viewing-focusing plane, said housing means being provided with an optical-path defining a longitudinal inner chamber means having a corresponding longitudinal optical axis centered along the length of said chamber and optically communicating at one front end with said butt-end receiver, holder and positioner, and being intermediately provided with objective lens mounting means and microscope objective lens means optically aligned with said receiver, holder and positioner focusable on the focusing plane and any cylindrical object's butt-end-surface coincident with the focusing plane; said optical-path-defining chamber means being provided adjacent to an opposite rear end of said chamber means with eyepiece lens mounting means and eyepiece lens means longitudinally adjustably carried by said eyepiece lens mounting means for focusing and providing a desired degree of apparent visual image magnification of a butt end surface of a cylindrical object being viewed and inspected while received, held and positioned in the focusing plane; said objective lens means, said objective lens mounting means, said eyepiece lens means, said eyepiece lens mounting means, and said optical-path-defining chamber means, together, effectively defining an inspection microscope effectively provided with focusing means comprising means for manually adjusting the relative longitudinal spacings between various of said lens means relative to each other and relative to the focusing plane and said butt-end-surface of said butt end of said cylindrical object, such as said butt-end-surface of said butt end of said fiber optics cable, co-planar with the focusing plane; said optical-path-defining longitudinal inner chamber means of said housing means being provided with and carrying illuminator means within said chamber means for providing, in a symmetrically positioned manner, within the optical-path-defining chamber means, illuminating light directed forwardly, said illuminator means being carried centrally by and in said optical-path-defining chamber means and being provided with separate, transversely connectable, controllably operable, electrical energizer means for controllably energizing and deenergizing said illuminator means; said illuminator means carried within said optical-path-defining longitudinal inner chamber means of said housing means comprising a bright field illuminator means substantially centrally positioned within said optical-path-defining chamber means, being located and directed for injecting illuminating light into the optical path along an optical axis of said optical-path-defining chamber means in a manner such as to redirect same forwardly and longitudinally along said optical path through said objective lens means toward said focusing plane in a direction substantially normal to said focusing plane for causing substantially directly reversed rearward reflection of light from a butt-end-surface being viewed and inspected in what is termed a bright field illuminated manner; said illuminator means carried within said optical-path-defining longitudinal inner chamber means of said housing further comprising a dark field illuminator means substantially concentrically positioned within said optical-path-defining chamber means and concentrically positioned around a central optical axis extending the length of said optical-path-defining chamber means and being located and directed for injecting obliquely directed substantially annularly arranged and concentrically positioned dark field illuminating light forwardly convergingly along said optical-path-defining chamber means just rearwardly of said focusing plane and directed sharply transversely convergingly centrally and forwardly angularly onto the focusing plane, and onto any cylindrical object's butt-end-surface co-planar with the focusing plane, for providing maximum oblique transversely-directed dark field illumination of the butt-end-surface being viewed and inspected in the focusing plane for causing rearward light reflection to occur only from surface irregularities and discontinuities on such a butt-end-surface being viewed and inspected while reflecting all other angularly incident light angularly impinging upon such a butt-end-surface in an angular reflected direction such as to be incapable of being returned to the eyepiece lens means and thus providing what is herein termed dark field illumination of such a butt-end-surface being inspected and viewed in the focusing plane, said angularly incident dark-field-illuminating light, and the means producing and angularly directing the angularly incident dark-field-illuminating light being so arranged, directed, and located relative to the focusing plane and relative to a front end of the centrally positioned objective lens means, as to cause rearwardly angularly directed dark field light reflections reflected from a butt-end-surface portion normal to the longitudinal optical axis to rearwardly and outwardly angularly diverge from the central longitudinal optical axis to an extent such as to be laterally displaced sufficiently to entirely miss, and to entirely laterally by-pass, the centrally symmetrically positioned objective lens means which optically encompasses a narrow central area of the chamber means immediately around the longitudinal optical axis only; said focusing means comprising a focusing assembly taking the form of an outer spirally grooved sleeve, provided with and defining an outer spiral groove, an inner longitudinally grooved sleeve, provided with and defining an inner longitudinal groove, and a short transverse fixed pin carried by said housing means and having a fixed end projecting into said grooves in both of said sleeves whereby relative rotation of said outer spirally grooved sleeve with respect to said fixed pin end will effectively produce longitudinal focusing movement of the pair of said sleeves and said butt end, and said corresponding butt-end-surface, of said cylindrical object, such as said butt-end-surface of said fiber optics cable, otherwise fixedly carried by said focusing assembly at a forward center portion of said focusing assembly concentric with the longitudinal optical axis of said chamber means, said focusing assembly being substantially centrally provided with controllably operable cable-holding means for receiving and being manually controllably firmly fastened around an outer cylindrical surface adjacent to a butt end of a cylindrical object, such as fiber optics cable.

2. A portable field inspection microscope as defined in claim 1, wherein said dark field illuminator means comprises an annularly arranged effective ring light source producing and forwardly directing an effective annular ring of light positioned rearwardly of said focusing plane and directed forwardly toward said focusing plane and further provided with forwardly converging effective mirror means terminating in a frontally-positioned circular aperture and annular-slot-defining means for inwardly and obliquely angularly reflecting an annular ring of light forwardly emitted by said effective ring light source.

3. A portable field inspection microscope as defined in claim 2, wherein said annular-slot-defining means and said forwardly converging mirror means are controllably longitudinally adjustably mounted for controllable longitudinal shifting of the plane of maximum concentration of said obliquely angularly directed dark field illumination rays of light so as to be coplanar and coincident with said focusing plane.

4. A portable field inspection microscope as defined in claim 1, wherein said bright field illuminator means comprises transversely directed lamp means, and effective focusing means for said lamp means positioned immediately transversely adjacent to the longitudinal optical axis of the optical path defined by said optical-path-defining chamber means and adjacent to, and just rearwardly of, said objective lens means, an angularly positioned partially light-transmissive and partially light-reflective mirror means operable to redirect a quantity of bright-field light from said bright field illuminator means lamp means directly forwardly toward the focusing plane in a manner substantially normal to the focusing plane and cooperable to cause at least a portion of said forwardly directed bright field light to impinge upon a butt end surface being inspected and viewed in a bright field illuminated manner to be directly reflected backwardly from unmarred portions of such a butt-end-surface through said light-transmissive mirror means to said eyepiece means for forming an enlarged image of such a butt-end-surface effectively illuminated in said bright-field illuminated manner.

* * * * *